United States Patent
Yamada

[11] Patent Number: 5,271,095
[45] Date of Patent: Dec. 14, 1993

[54] IMAGE PROCESSING APPARATUS FOR ESTIMATING HALFTONE IMAGES FROM BILEVEL AND PSEUDO HALFTONE IMAGES

[75] Inventor: Kiyoshi Yamada, Chigasaki, Japan

[73] Assignee: Kabushiki Kaisha Toshiba, Kawasaki, Japan

[21] Appl. No.: 452,671

[22] Filed: Dec. 19, 1989

[30] Foreign Application Priority Data

Dec. 20, 1988 [JP] Japan ................ 63-319584

[51] Int. Cl.⁵ .................................. G06F 15/62
[52] U.S. Cl. ........................... 395/128; 395/132; 358/298
[58] Field of Search ............... 364/518–522; 395/109, 128–130, 132, 135; 358/298

[56] References Cited

U.S. PATENT DOCUMENTS

| | | | |
|---|---|---|---|
| 4,649,500 | 3/1987 | Yamada et al. | 364/518 |
| 4,675,831 | 6/1987 | Ito et al. | 364/518 |
| 4,866,534 | 9/1989 | Tada | 364/518 X |
| 4,920,501 | 4/1990 | Sullivan et al. | 364/518 |
| 5,045,880 | 9/1991 | Evanitsky et al. | 364/521 X |

Primary Examiner—Heather R. Herndon
Assistant Examiner—Almis Jankus
Attorney, Agent, or Firm—Oblon, Spivak, McClelland, Maier & Neustadt

[57] ABSTRACT

An image processing apparatus for receiving digital image data including bilevel images such as character and line draw images and pseudo halftone images such as dither image and error diffusion image and for estimating a halftone image. The apparatus comprises a dither image detector for detecting the presence/absence of a cycle of the image from a peak interval of auto-correlation values of the respective lines of the image data and detecting the pattern when the cycle is present, a density variation detector for detecting a variation in density of the image of each cycle, a pseudo halftone image detector for detecting a degree of variance of pixels from a dot pattern of a pixel region having a predetermined range, a selector for selecting an aperture having a size equal to the detected cycle when the input image has a cycle and the variation in density is small, an aperture having a size smaller than the detected cycle when the variation in density is large, and an aperture having a size corresponding to the degree of variance of pixels when the cycle is not detected. The apparatus further comprises a halftone image estimating circuit for averaging the digital image data by the aperture having the selected size.

19 Claims, 28 Drawing Sheets

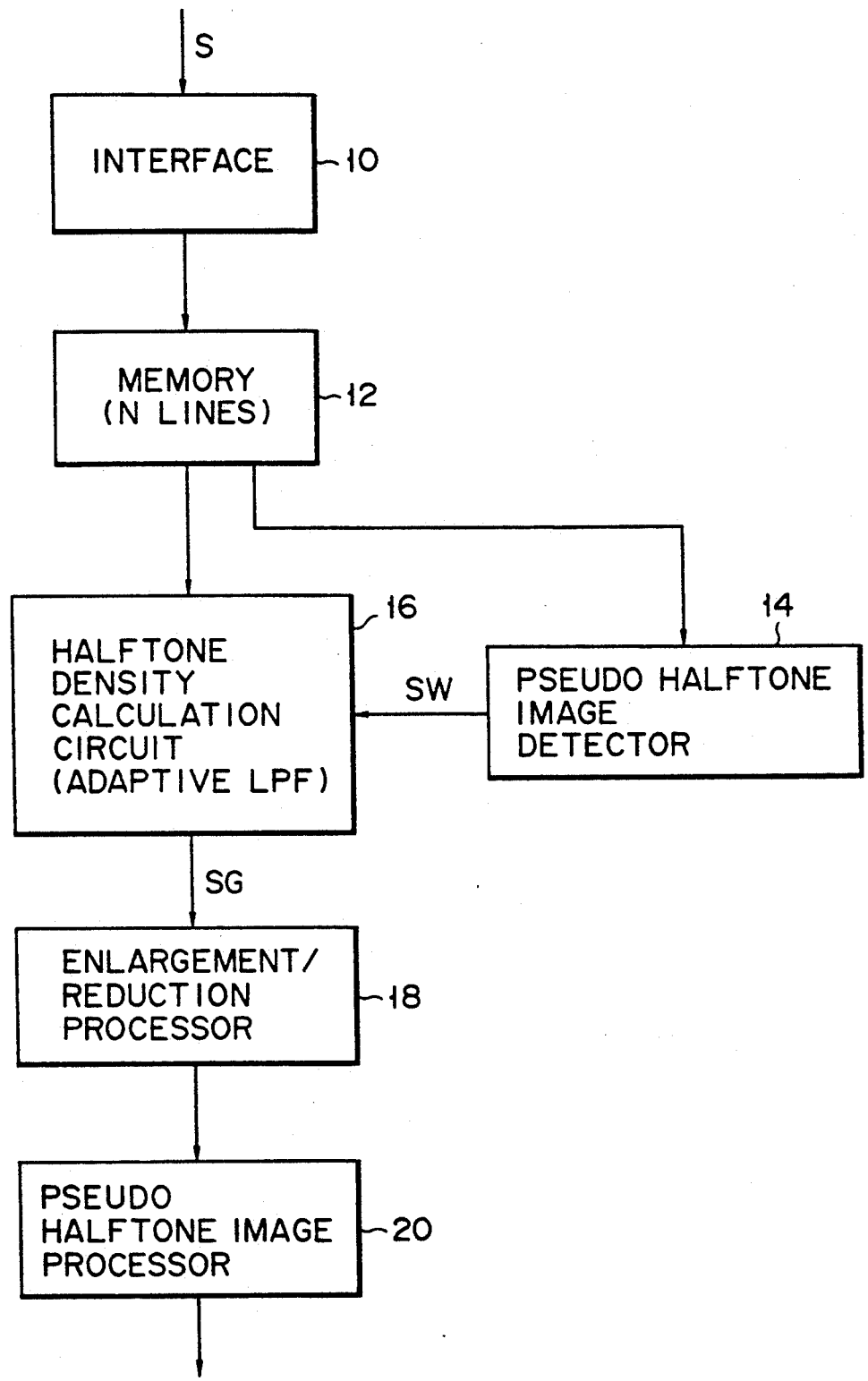
F I G. 1

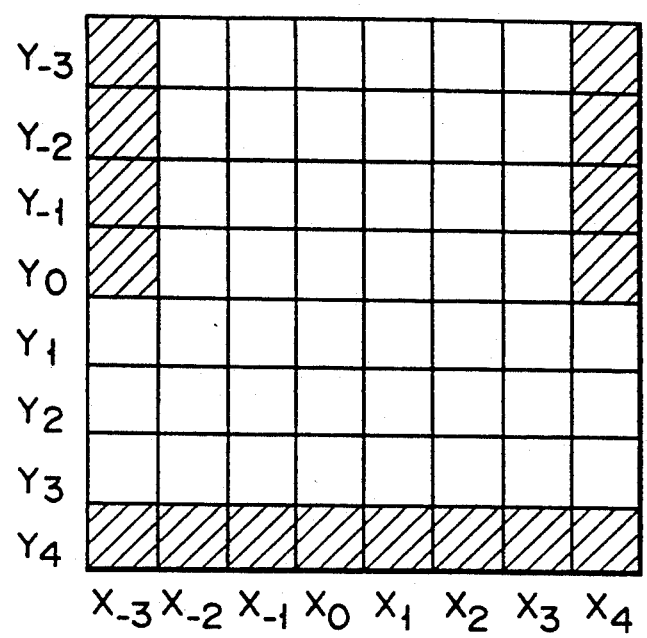
F I G. 7E
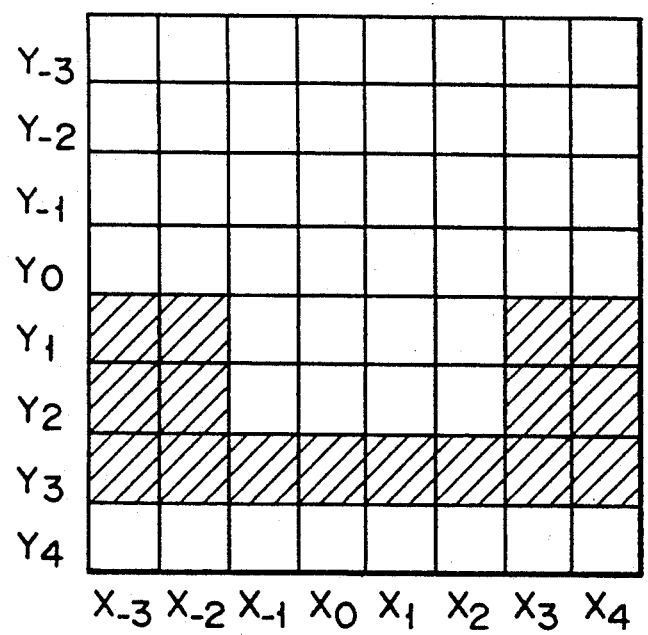
F I G. 7F

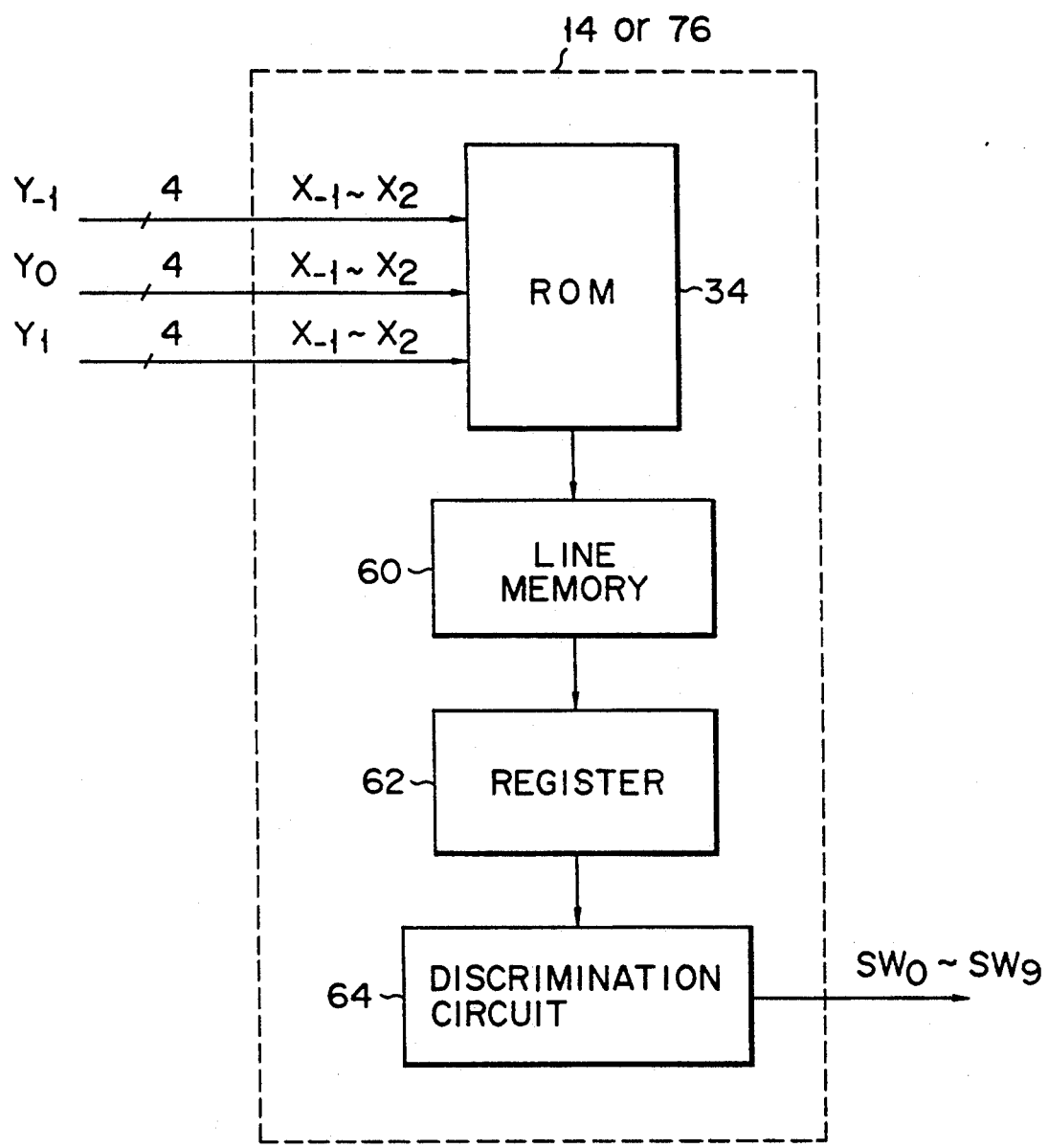
F I G. 9

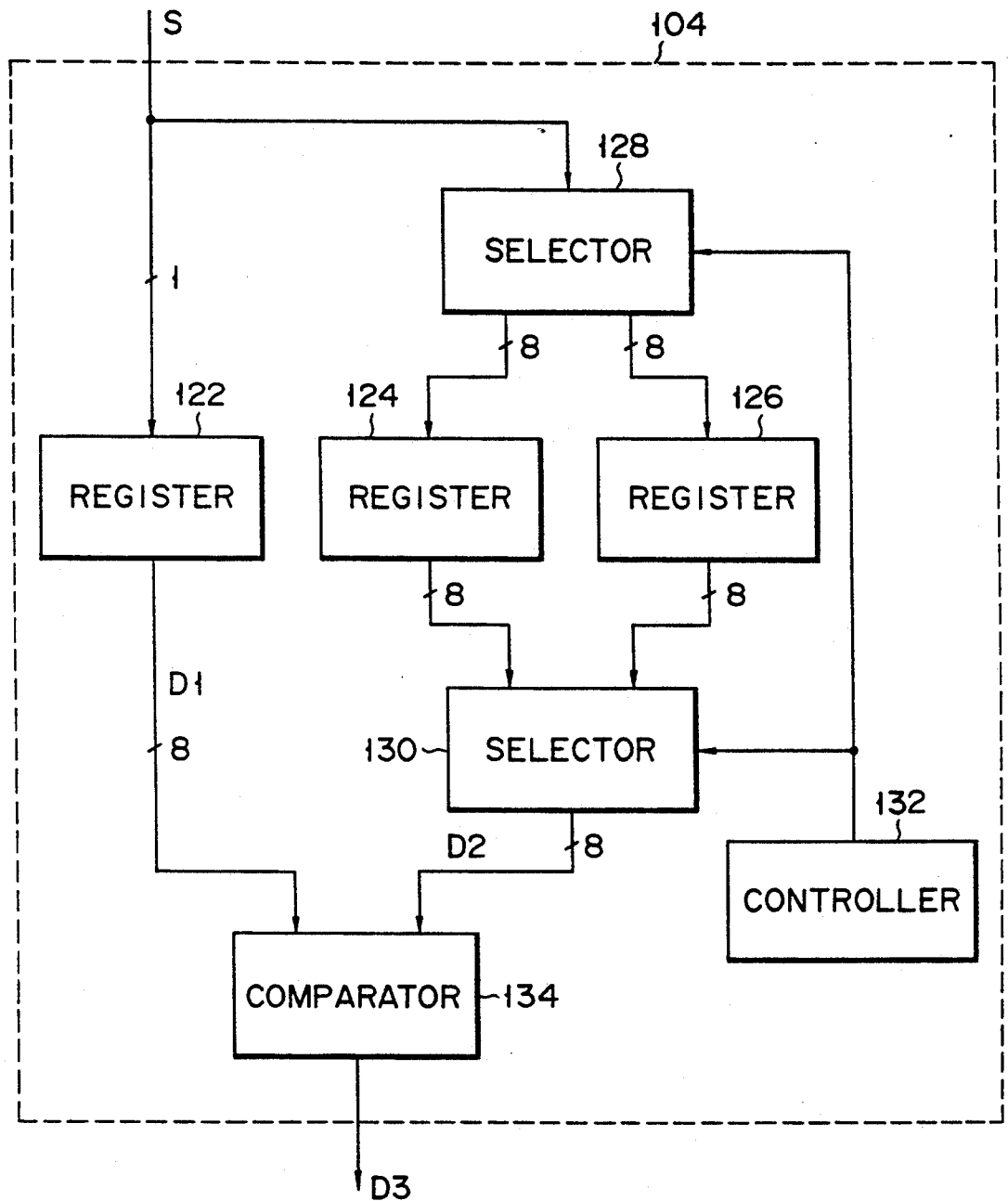
F I G. 14

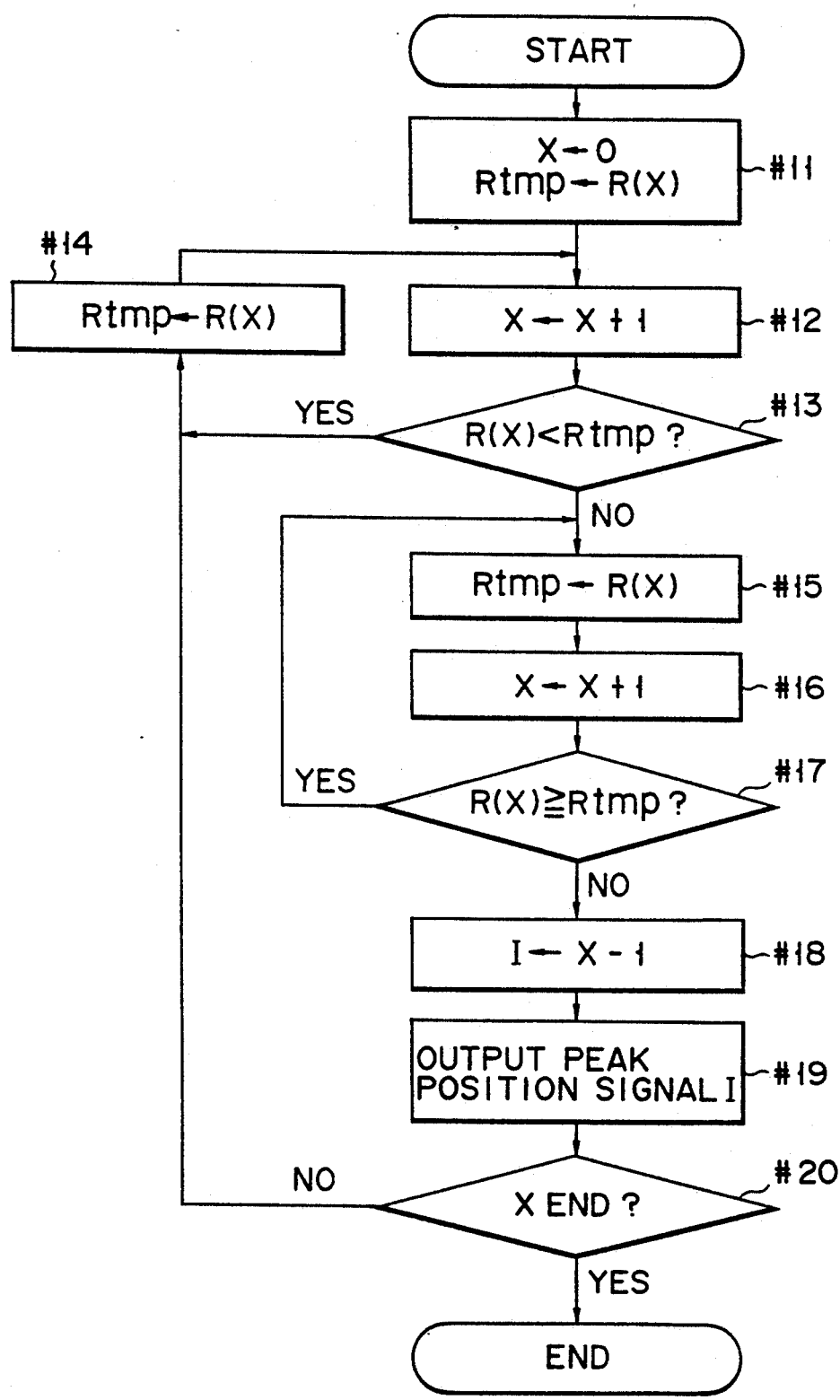
F I G. 21

IMAGE PROCESSING APPARATUS FOR ESTIMATING HALFTONE IMAGES FROM BILEVEL AND PSEUDO HALFTONE IMAGES

BACKGROUND OF THE INVENTION

1. Field of the Invention

The present invention relates to an image processing apparatus for reproducing a halftone image from a digital image such as a pseudo halftone image.

2. Description of the Related Art

In recent years, various types of digital document data processing apparatuses such as facsimile systems and wordprocessors have been developed and are often networked. However, when resolutions of document data to be processed by different apparatuses in the network are different from each other, the document data must be enlarged or reduced before transmission or after reception.

Known methods of enlarging/reducing document images before transmission or after reception are a selective processing conversion (SPC) method, a logical sum method (Journal of the Institute of Data Processing, PP. 920-925, September, 1985), a projection method (Journal of the Institute of Image Electronics, Vol. 11, No. 2, PP. 72-83, 1982), and the like. Image data subjected to these conventional enlargement/reduction processing methods are limited to bilevel image data, e.g., character and line draw data or halftone image data, e.g., photographic data having an analog density value.

Document data to be processed by the recent document data processing apparatuses, however, include pseudo halftone image data such as image data processed by a dither method (to be referred to as dither image data hereinafter) and image data processed by an error diffusion method (to be referred to as error diffusion image data hereinafter) in addition to bilevel image data. When the same enlargement/reduction processing as in the bilevel or halftone image is performed for these pseudo halftone image data, gradation and sharpness of the pseudo halftone image may be undesirably lost. In addition, a moire pattern appears in the dither image according to the enlargement/reduction coefficient, thus greatly degrading the image quality.

In order to prevent the above drawbacks, pseudo halftone image data must be converted into halftone image data prior to enlargement/reduction processing. An image processing method described in Published Unexamined Japanese Patent Application No. 62-114377 is available as a convention method of performing pseudo halftone image/halftone image conversion. In this method, the pseudo halftone image is restricted to an dither image. Image data is divided into pixel blocks each having a predetermined size, and the number of black pixels (or white pixels) within each block is counted, and the counted value is averaged by using the size of the block, thereby estimating a halftone density value of each pixel block.

According to this method, however, when the predetermined block size is small, halftone image data completely free from a frequency component of the dither image cannot be reproduced, and generation of a moire pattern due to the dither image pattern cannot be perfectly prevented. To the contrary, when the block size is too large, the cyclic image having a repetition cycle shorter than the dither matrix cycle cannot be reproduced, thereby reducing the sharpness of the original image.

Another conventional example is an image processing method described in Published Unexamined Japanese Patent Application No. 61-35070. In this method, the pseudo halftone image is also restricted to the dither image. Image data are averaged in units of blocks whose size is equal to that of the known dither matrix, thereby obtaining a halftone image. Although this method can eliminate the moire pattern, reproducibility of information of a cyclic pattern smaller than that of the dither matrix is poor. As a result, sharpness of the original image data is often lost.

The both prior arts described above are effective when images to be processed are restricted to only dither images. However, they are not effective for other pseudo halftone images such as an error diffusion image. Moreover, when bilevel image data such as character and line draw data and the pseudo halftone image data are mixed in digital image data, no effectiveness can be expected.

SUMMARY OF THE INVENTION

It is an object of the present invention to provide an image processing apparatus for reproducing a halftone image from a digital image including a plurality of types of pseudo halftone images and a plurality of types of bilevel images without losing gradation and sharpness of an original image by averaging the digital image data within an aperture having a size in accordance with the type of the digital image.

An image processing apparatus according to the present invention comprises a pseudo halftone image detector for detecting the possibility that a digital image is a pseudo halftone image in accordance with a degree of variance of pixels of digital image data, a dither image detector for detecting whether or not the digital image is a dither image in accordance with a cycle of the digital image a density variation detector for detecting a variation in density of the image in units of cycles in accordance with a detection result from the dither image detector, and a halftone density calculating circuit, responsive to outputs from the pseudo halftone image detector, the dither image detector, and the density variation detector, for averaging the digital image data within an aperture size equal to the detected cycle when the digital image is detected as being a dither image and a variation in density is small, within an aperture size smaller than the detected cycle when the digital image is detected as being a dither image and a variation in density is large, and within an aperture size corresponding to a possibility that the digital image is a pseudo halftone image when the digital image is detected as being a pseudo halftone image except for the dither image.

In the image processing apparatus of the present invention, when the digital image is detected as being a dither image, the digital image is averaged within an aperture having a size in accordance with the cycle of the dither image. A moire pattern formed in the reproduced pseudo halftone image due to a difference between the dither cycle and the averaging aperture size can be prevented. When the digital image is detected as being a bilevel image, it is averaged by the minimum size (in units of pixels, in other words, it is not averaged), and the quality of the original image is not degraded. When the digital image is detected as being an error diffusion image, it is averaged in accordance with the size corresponding to the degree of variance of the pixels, thereby allowing reproduction of a halftone image very similar to the original image. In the case of the dither image, the aperture size is decreased in accordance with a variation of density in units of dither matrices. Therefore, sharpness of a portion having a large variation in density can be accurately reproduced.

BRIEF DESCRIPTION OF THE DRAWINGS

FIG. 1 is a block diagram of an image processing apparatus according to the first embodiment of the present invention;

FIGS. 7A to 7F are views showing image data input to the halftone density calculation circuit;

FIG. 9 is a block diagram showing a main part according to the third embodiment of the present invention;

FIG. 14 is a block diagram showing a detailed arrangement of an auto-correlation processor of the fifth embodiment;

FIG. 21 is a flow chart showing an operation of a peak position detector of the fifth embodiment;

DETAILED DESCRIPTION OF THE PREFERRED EMBODIMENTS

Figure 2:
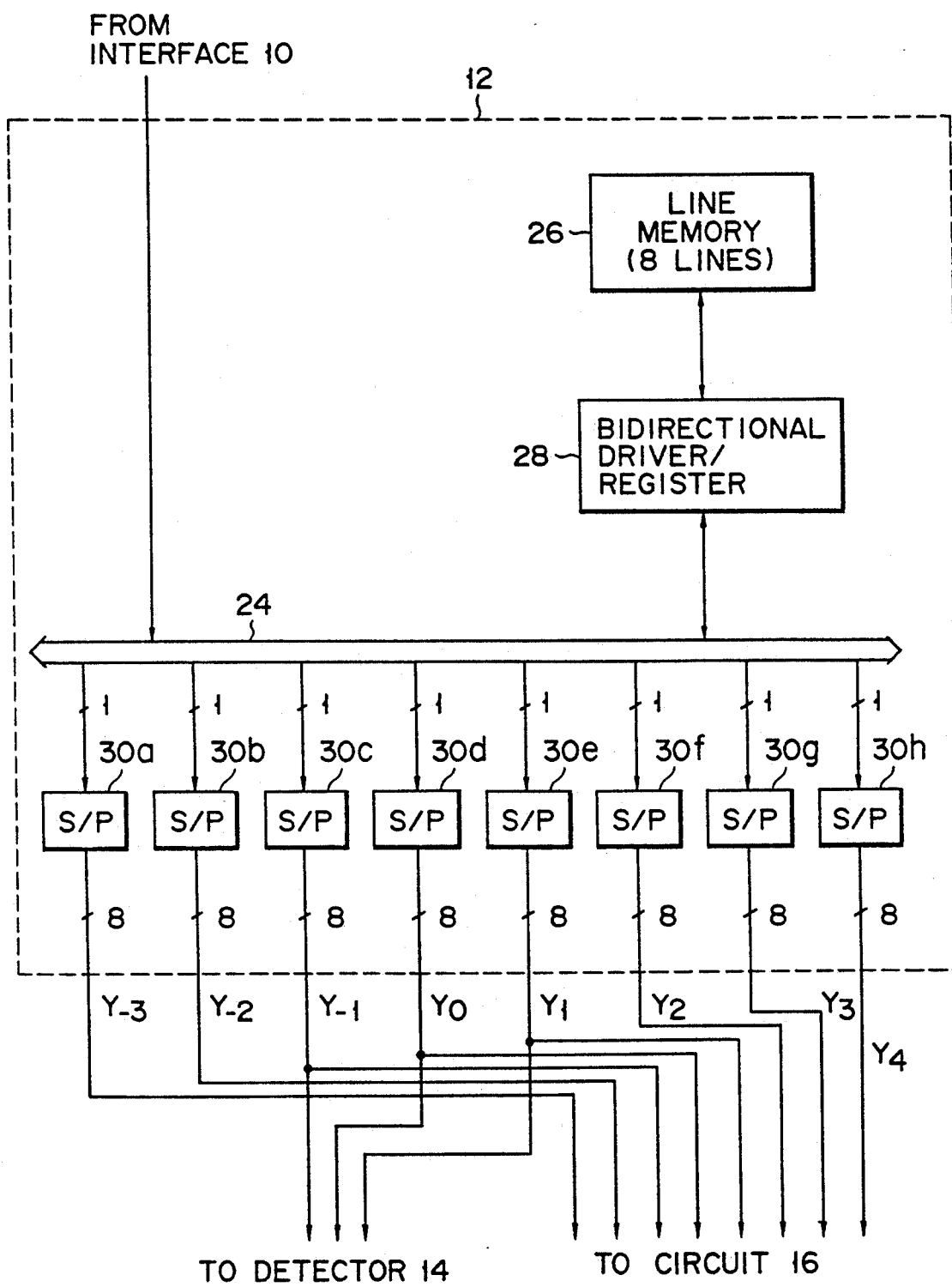
FIG. 2 is a block diagram showing an arrangement of a memory of the first embodiment.

Preferred embodiments of image processing apparatuses according to the present invention will be described with reference to the accompanying drawings. FIG. 1 is a block diagram showing an arrangement according to the first embodiment. A memory 12 having a capacity for storing N-line image data is connected to an interface 10 which receives digital image data (one pixel/bit) through a communication or transmission line (not shown). The memory 12 stores N-line digital image data S. An output from the memory 12 is supplied to a pseudo halftone image detector 14 for discriminating the possibility that the pixel is included in the pseudo halftone image in accordance with variance of the neighboring pixels, and a halftone density calculation circuit 16 constituted by an adaptive LPF for averaging digital image data within an aperture or reference region having a size in accordance with an output SW from the detector 14 and for estimating a halftone density SG of the pixel of interest.

Of the outputs from the memory 12, the pseudo halftone image detector 14 discriminates whether a peripheral pixel region consisting of a predetermined number of pixels around the pixel of interest to be averaged around the pixel of interest is similar to a pseudo halftone image such as a dither image or an error diffusion image, or a bilevel image such as characters or line draws, in accordance with the degree of variance of a dot pattern of pixels within the peripheral pixel region. A discrimination result SW is supplied to the halftone density calculation circuit 16. The halftone density calculation circuit 16 averages black or white pixels of the image data within the rectangular reference region having a size corresponding to the discrimination result SW from the detector 14 with reference to the pixel of interest as the central pixel. An averaged value is defined as a halftone density of the pixel of interest. For this reason, the memory 12 must have a capacity corresponding to the number of lines of the maximum reference region size.

Halftone image data SG output from the halftone density calculation circuit 16 is output through an enlargement/reduction processor 18 and a pseudo halftone image processor 20. The enlargement/reduction processor 18 changes a resolution of image data in accordance with a known method. The pseudo halftone image processor 20 processes the halftone image data in accordance with a known dither or error diffusion method, thereby generating pseudo halftone data.

An operation of the first embodiment will be described below. The image data S is input to the interface 10, bit data of pixels are serially stored in the memory 12. The detailed arrangement of the memory 12 is shown in FIG. 2. The memory 12 includes a line memory 26 having an 8-line capacity. The image data from the interface 10 is written in the line memory 26 through a data bus 24 and a bidirectional driver/register 28. Eight serial/parallel (S/P) converters 30a to 30h are connected to the data bus 24. The serial/parallel converters 30a to 30h respectively receive one-bit image data and output 8-bit parallel image data $Y_{-3} Y_4$. All the output image data $Y_{-3}$ to $Y_4$ are supplied to the halftone density calculation circuit 16, and some image data, i.e., the image data $Y_{-1}$, $Y_0$, and $Y_1$ are supplied to the pseudo halftone image detector 14.

If memory areas corresponding to the lines of the line memory 26 are defined as $L_0$ to $L_7$, image data is always written in the memory area $L_0$. That is, the serial image data input from the interface 10 to the bidirectional driver/register 28 through the data bus 24 is temporarily stored in the driver/register 28. The driver/register 28 reads out the 7-bit image data which is already written in the memory areas $L_0$ to $L_6$ of the line memory 26 and which corresponds to the pixel position corresponding to the image data stored in the driver/register 28. The stored input image data is written in the memory area $L_0$ and the readout image data is stored in the memory areas $L_1$ to $L_7$.

The bidirectional driver/register 28 writes the 8-bit data stored in the memory areas $L_0$ to $L_7$ respectively in the serial/parallel converters 30a to 30h as well as writes the 8-bit data into the line memory 26. That is, the serial/parallel converters 30a to 30h receive 8-line data. When 8-pixel data for each line is input, the converters 30a to 30h simultaneously output 64-pixel (=8 lines×8 pixels) image data.

Figure 3:
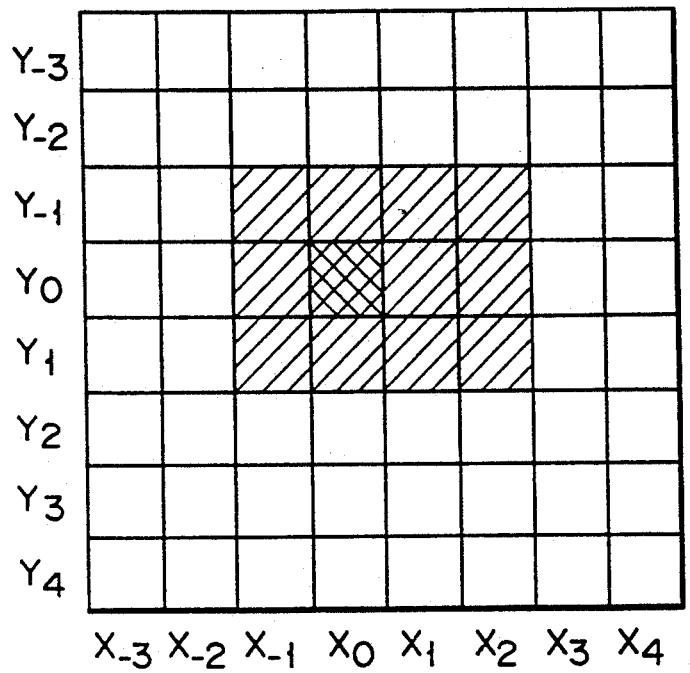
FIG. 3 is a view showing a peripheral pixel region for checking a dot pattern of a pixel of interest.

FIG. 3 is a view showing a two-dimensional matrix of the 8 (lines)×8 (pixels) image data output from the serial/parallel converters 30a to 30h. The Y direction corresponds to the line direction. If a pixel of ($X_0$, $Y_0$) represented by the cross-hatched area is given as a pixel of interest whose halftone density is to be calculated by the halftone density calculation circuit 16, an area of three lines $Y_{-1}$ to $Y_1$ and four dots $X_{-1}$ to $X_2$ is defined as a peripheral pixel region for discriminating whether or not the pixel of interest is included in the pseudo halftone image. Only these data are input to the pseudo halftone image detector 14. The 8 (lines)×8 (pixels) image data shown in FIG. 3 is supplied to the halftone density calculation circuit 16.

Figure 4:
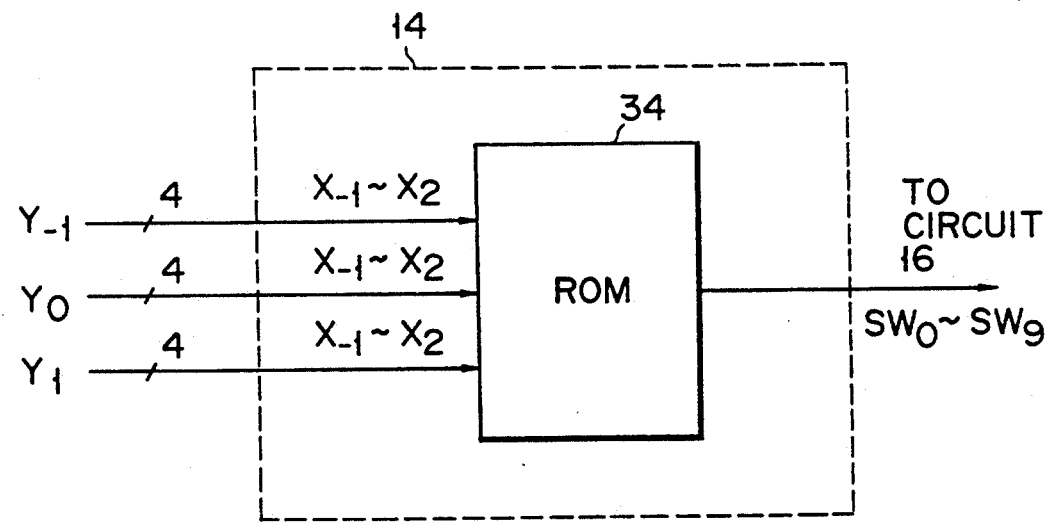
FIG. 4 is a block diagram showing a detailed arrangement of a pseudo halftone image detector of the first embodiment.

The pseudo halftone image detector 14 comprises a ROM 34 having a table for receiving image data of the peripheral pixel region as an address, as shown in FIG. 4, and outputting a discrimination signal SW representing a degree of possibility that this image data is the pseudo halftone image data. The discrimination table of the ROM 34 is determined on the basis of the statistic data shown in FIG. 5.

Figure 5:
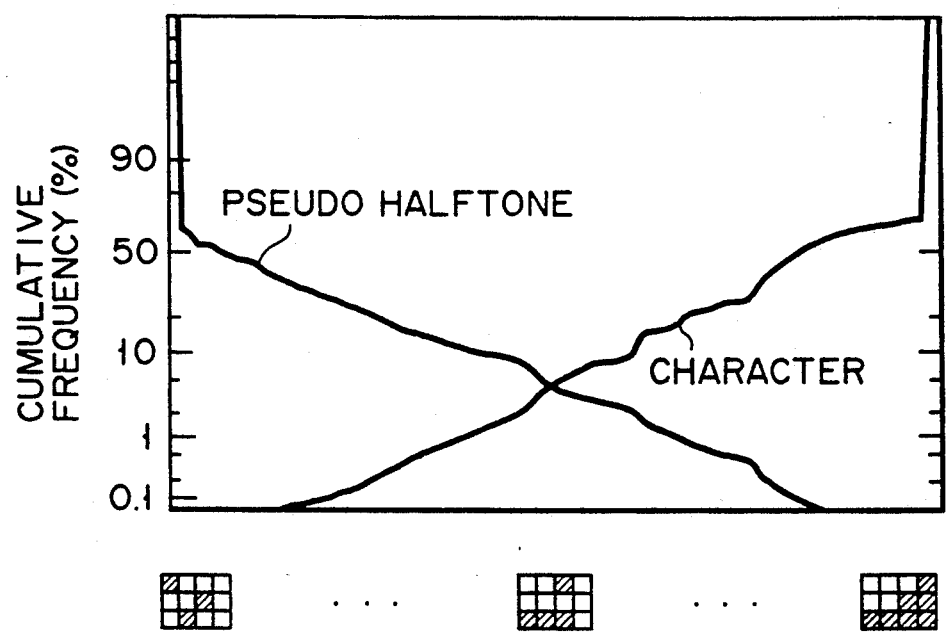
FIG. 5 is a graph showing statistic data used for determining data of a ROM of the pseudo halftone image detector.

FIG. 5 is a graph obtained such that a plurality of sample images consisting of pseudo halftone images such as error diffusion images and a plurality of sample images consisting of bilevel images such as characters and line draws, and ratios of the cumulative values of the frequency of occurrence of dot patterns observed upon scanning the sample images with a 3×4 aperture are arranged from the larger values The degree of possibility that the pixel of interest is included in the pseudo halftone image and the degree of possibility that the pixel of interest is included in the simple bilevel image can be estimated from the dot pattern of the peripheral pixel region in accordance with the above statistic data. All 3×4 dot patterns are classified into ten classes with regards to the degree of variance of the pixels in the dot pattern and discrimination signals $SW_0$ to $SW_9$ are caused to correspond to classes from the class having a higher degree of variance of the pixels in the peripheral pixel region (the possibility that the input image data is the pseudo halftone image is high) to a class having a lower degree of variance (the possibility that the input image data is the simple bilevel image is high). When the ROM 34 receives a dot pattern of a peripheral image region as an address, it outputs one of the discrimination signals $SW_0$ to $SW_9$.

Figure 6:
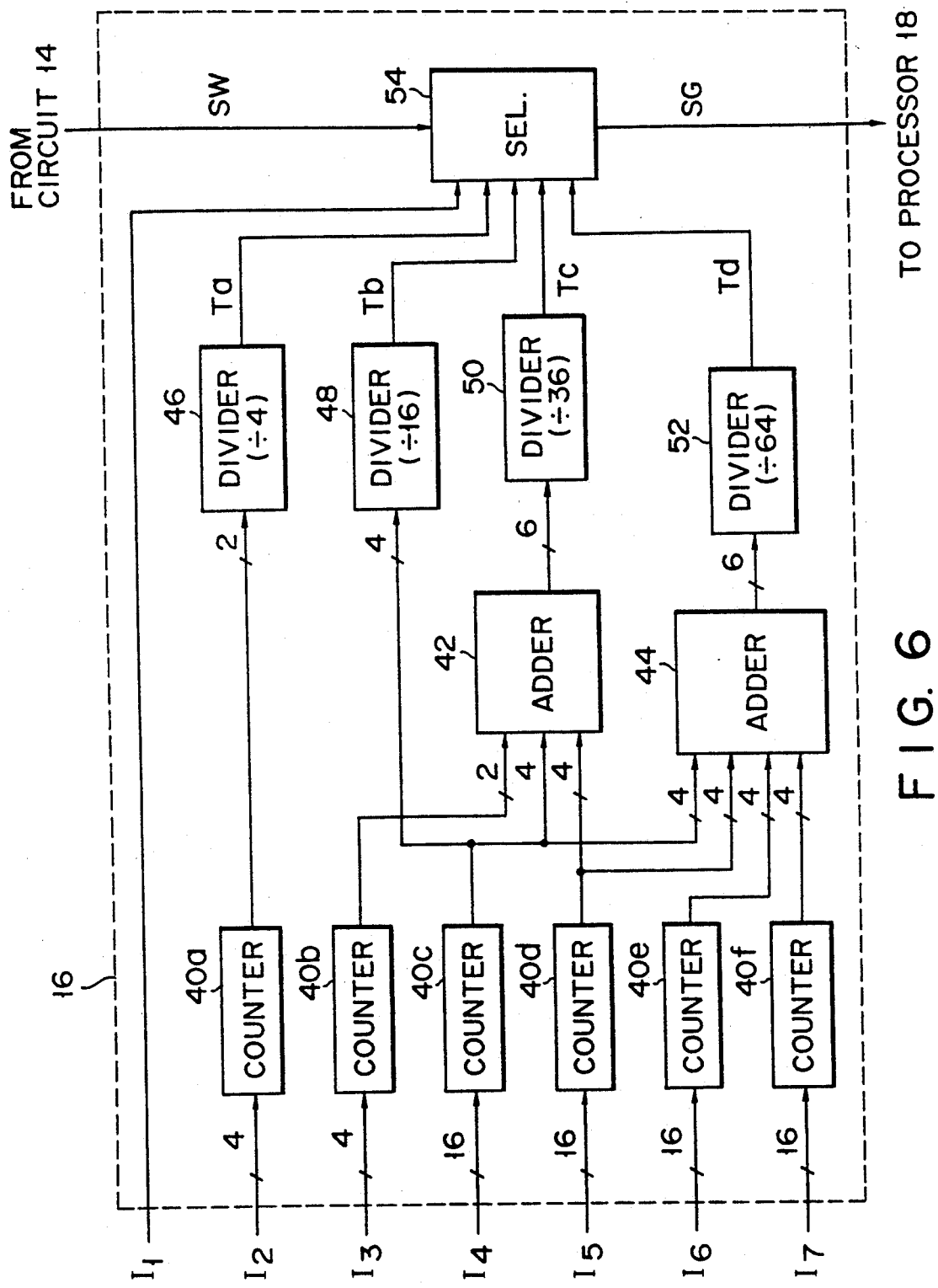
FIG. 6 is a block diagram showing a detailed arrangement of a halftone density calculation circuit of the first embodiment.
Figure 7A:
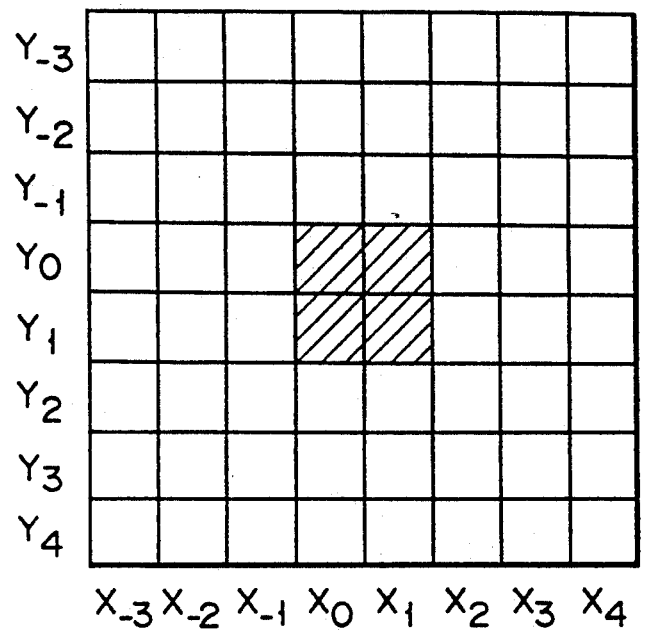
Figure 7B:
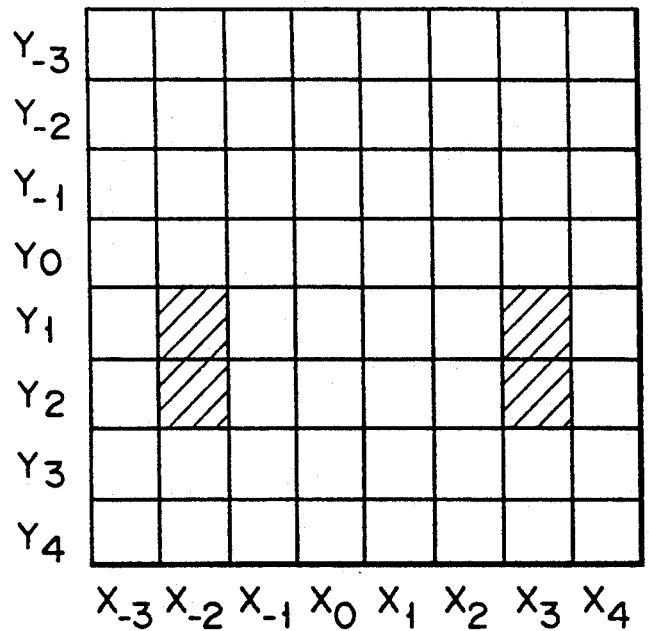
Figure 7C:
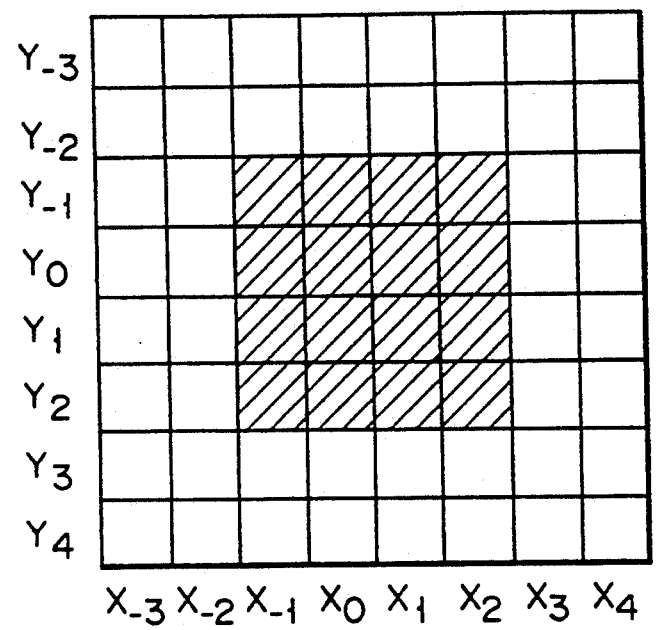
Figure 7D:
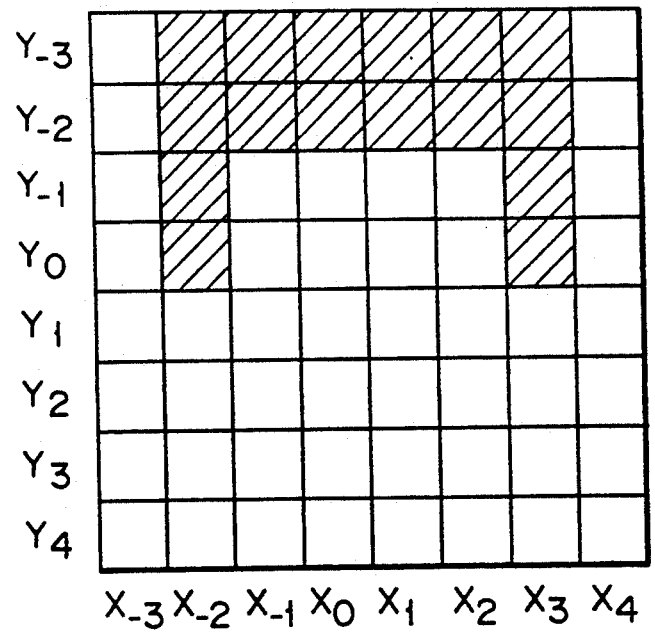

The 8×8 image data shown in FIG. 3 is input to the halftone density calculation circuit 16. A detailed arrangement of the halftone density calculation circuit 16 is shown in FIG. 6. The calculation circuit 16 comprises counters 40a to 40f, adders 42 and 43, dividers 46, 48, 50, and 52, and a selector 54. Input data $I_1$ to $I_7$ are data obtained by combining the following data in the 8×8 pixel image data (Y, X) so as to facilitate calculations of average values of the image data within apertures having different sizes. Pixels included in the input data $I_2$ to $I_7$ are represented by hatched portions in FIGS. 7A to 7F.

$I_1$ (0, 0)
$I_2$ (0, 0), (0, 1), (1, 0), (1, 1)
$I_3$ (1, −2), (1, 3), (2, −2), (2, 3)
$I_4$ (−1, −1), (−1, 0), (−1, ,1), (−1, 2), (0, −1),
   (0, 0), (0, 1), (0, 2), (1, −1), (1, 0), (1, 1), (1, 2),
   (2, −1), (2, 0), (2, 1), (2, 2)
$I_5$ (−3, −2), (−3, −1), (−3, 0), (−3, 1), (−3, 2),
   (−3, 3), (−2, −2), (−2, −1), (−2, 0), (−2, 1), (−2, 2),
   (−2, 3), (−1, −2), (−1, 3), (0, −2), (0, 3)
$I_6$ (4, −3), (4, −2), (4, −1), (4, 0), (4, 1),
   (4, 2), (4, 3), (4, 4), (−3, −3), (−3, 4), (−2, −3),
   (−2, 4), (−1, −3), (−1, 4), (0, −3), (0, 4)
$I_7$ (1, −3), (1, −2), (1, 3), (1, 4), (2, −3),
   (2, −2), (2, 3), (2, 4), (3, −3), (3, −2), (3, −1),
   (3, 0), (3, 1), (3, 2), (3, 3), (3, 4)

The halftone density calculation circuit 16 performs averaging processing by using five aperture sizes, i.e., 1×1 pixel ($I_1$), 2×2 pixels ($I_2$), 4×4 pixels ($I_4$), 6×6 pixels ($I_3+I_4+I_5$), and 8×8 pixels ($I_4+I_5+I_6+I_7$). That is, the counters 40a to 40f count the numbers of black (or white) pixels included in the input data $I_2$ to $I_7$. The adder 42 adds the counts of the input data $I_3$, $I_4$, and $I_5$ output from the counters 40b, 40c, and 40d and calculates a sum of the numbers of pixels for the 6×6 pixel aperture size. The adder 44 adds the count outputs of the input data $I_4$, $I_5$, $I_6$, and $I_7$ output from the counters 40c to 40f and calculates a sum of the number of pixels for the 8×8 pixel aperture size. The dividers 46 to 52 divide the sums of the numbers of pixels by the numbers of pixels of the corresponding peripheral pixel regions so as to obtain estimated values of halftone densities at the respective apertures (i.e., the peripheral pixel regions). The selector 54 selects one of densities Ta to Td simultaneously estimated by the respective aperture sizes in accordance with the discrimination signals $SW_0$ to $SW_9$ output from the pseudo halftone image detector 14 and outputs the selected output as halftone image data SG. For example, assume that the discrimination signal $SW_0$ represents a high degree of pixel variance, and the discrimination signal $SW_9$ represents a high degree of pixel concentration. The signal $SW_0$ selects a density estimated by the 6×6 or 8×8 pixel aperture size, and the signal $SW_9$ selects a density estimated by the 1×1 or 2×2 pixel aperture size. The signals $SW_3$ to $SW_5$ select a density estimated by the 4×4 pixel aperture size.

The halftone image data SG thus obtained is enlarged or reduced by the enlargement/reduction processor 18 and is then converted into a pseudo halftone image signal again by the pseudo halftone image processor 20. The resultant pseudo halftone image signal is output.

According to the first embodiment, as described above, the degree of variance of the pixels of the digital image data is discriminated to determine whether or not the image is a pseudo halftone image or a bilevel image. The aperture size for averaging digital image data is changed to estimate the halftone image data from the digital image data in accordance with the discrimination result. The pseudo halftone image having a higher degree of pixel variance is averaged with a larger aperture size, whereas the bilevel image having a lower degree of pixel variance is averaged with a smaller aperture size. Therefore, a halftone image free from a moire pattern and excellent in reproducibility of minute portions can be estimated for the pseudo halftone image. For the bilevel image, an image free from degradation of a resolution can be estimated.

Figure 8:
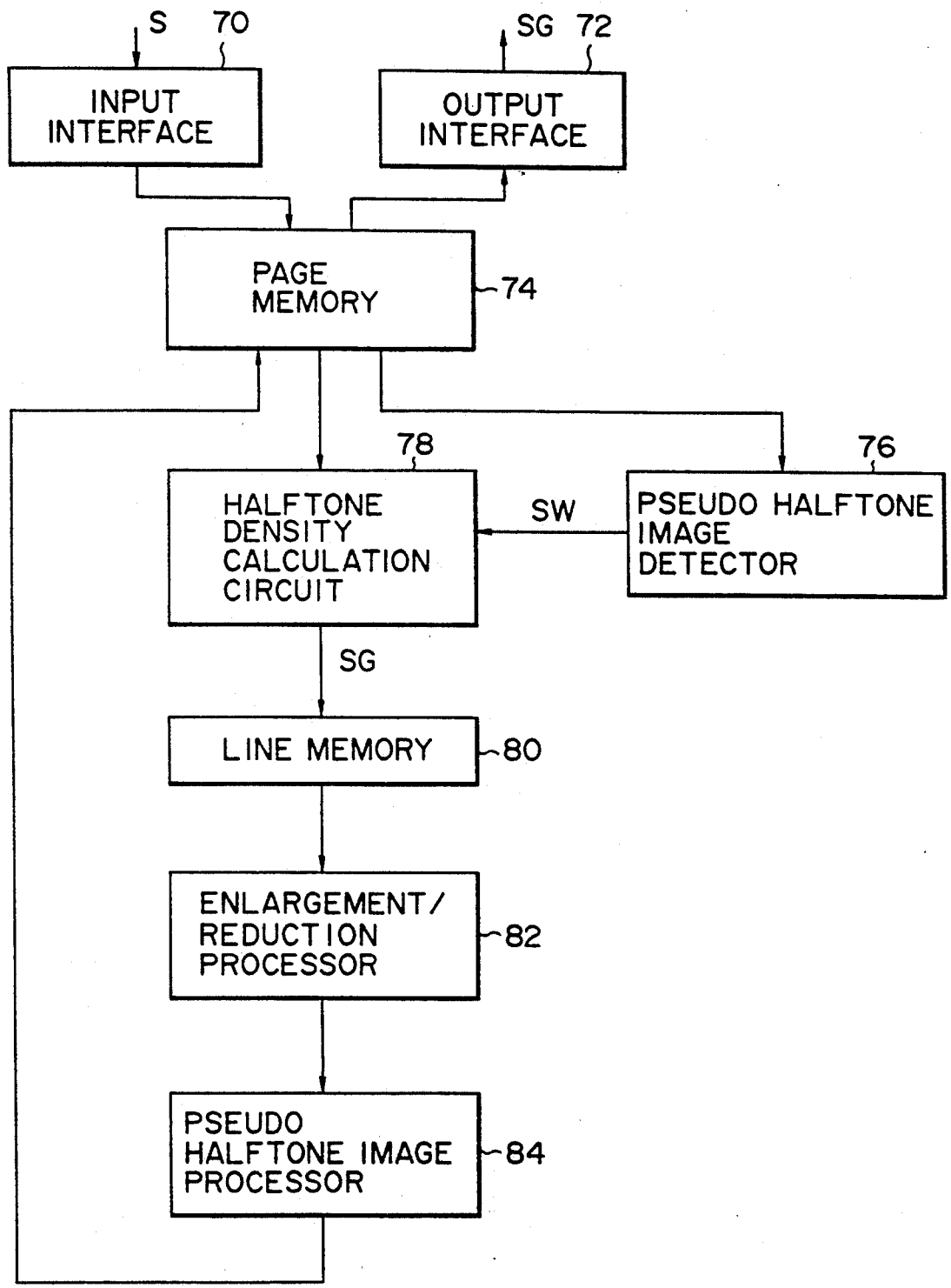
FIG. 8 is a block diagram showing an image processing apparatus according to the second embodiment of the present invention.

FIG. 8 is a block diagram of the second embodiment of the present invention. An input interface 70 for receiving digital image data S from a communication or transmission line and an output interface 72 for outputting estimated halftone image data SG to the communication or transmission line are arranged in place of the interface 10 of the first embodiment. Although realtime processing is performed in the first embodiment, a page memory 74 for storing image data in units of pages is arranged as a memory in order to perform batch processing in the second embodiment. An output from the page memory 74 is input to a pseudo halftone image detector 76 and a halftone density calculation circuit 78 in the same manner as in the first embodiment. An output from the halftone density calculation circuit 78 is temporarily stored in a line memory 80, and then stored again in the page memory 74 through an enlargement/reduction processor 82 and the pseudo halftone image processor 84. The image data is then output through the output interface 72.

The pseudo halftone image detector 76 and the halftone density calculation circuit 78 average image data stored in the page memory 74 by using an appropriate sized aperture in the same manner as in the first embodiment and estimates a halftone image. The line memory 80 stores plural-line halftone image estimated by the halftone density calculation circuit 78. A minimum capacity of the line memory 80 is the number of lines as an inverse number of a reduction coefficient of the enlargement/reduction processor 82. For example, when a reduction coefficient is 0.5, the line memory must have a 2-line memory capacity to convert two lines into one line. The halftone image reduced by the enlargement/reduction processor 82 is expressed as a pseudo halftone image by the pseudo halftone image processor 84 and is stored in the page memory 74. When enlargement/reduction processing of one page is completed, the pseudo halftone image is output from the page memory 74 to an external device through the output interface 72.

Figure 10:
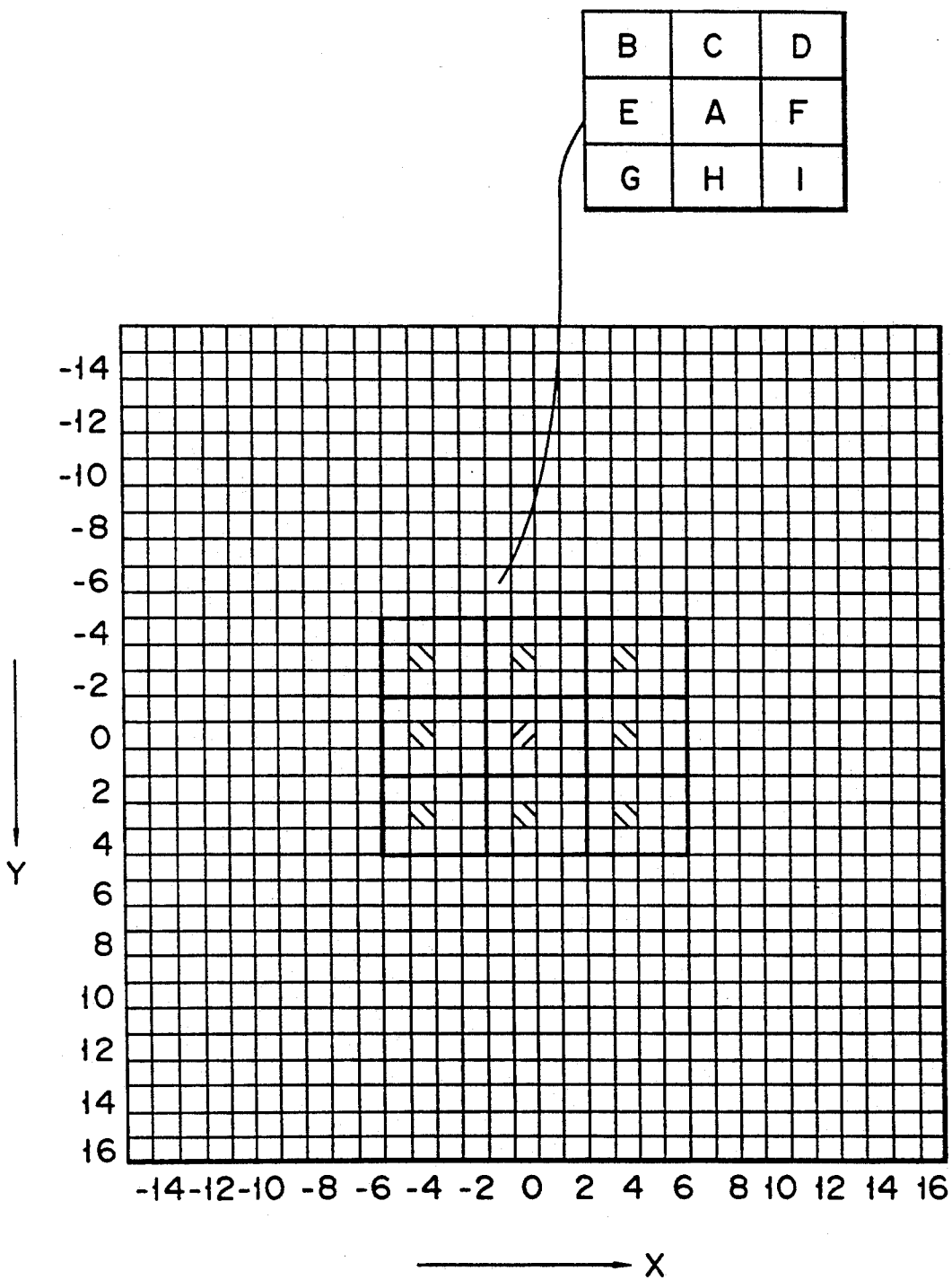
FIG. 10 is a view showing a peripheral pixel region of the third embodiment.

FIG. 9 is a block diagram showing a main part of the third embodiment of the present invention. This embodiment exemplifies a modification of the pseudo halftone image detector 14 and 76 of the first and second embodiment and aims at improving discrimination precision of types of image including a pixel of interest with reference to a larger peripheral pixel region. A ROM 34 is identical with the ROM shown in FIG. 4. A discrimination signal SW from the ROM 34 is stored in a line memory 60 having an N-line (e.g., 9 lines) memory capacity. An output from the line memory 60 is input to a register 62. The register 62 reads out nine discrimination signals of peripheral pixel regions A to I, i.e., the peripheral pixel region A including the pixel of interest and its eight peripheral pixel regions B to I, as shown in FIG. 10. The readout discrimination signals are supplied to a discrimination circuit 64. The discrimination circuit 64 compares a discrimination signal of the region A including the pixel of interest with the discrimination signals of the eight regions B to I. When the discrimination signal of the region A coincides with all the discrimination signals of the regions B to I, the discrimination signal SW of the region A is output directly. When the discrimination signal of the region A is different from at least one of the discrimination signals of the regions B to I, an image within the region A may possibly include noise, and this discrimination signal SW may have an error. In consideration of the discrimination signals of the eight peripheral regions B to I, the discrimination signal of the region A is corrected. For example, an average value of the discrimination signals of the eight peripheral regions, or a discrimination signal having a maximum frequency of occurrence is output as the discrimination signal of the region A.

According to the third embodiment, the peripheral pixel region for discriminating the types of image can be widened without increasing the capacity of the ROM 34. A discrimination error of the types of image caused by noise included in an input image can be prevented, and therefore, a more appropriate aperture size can be selected.

Figure 11:
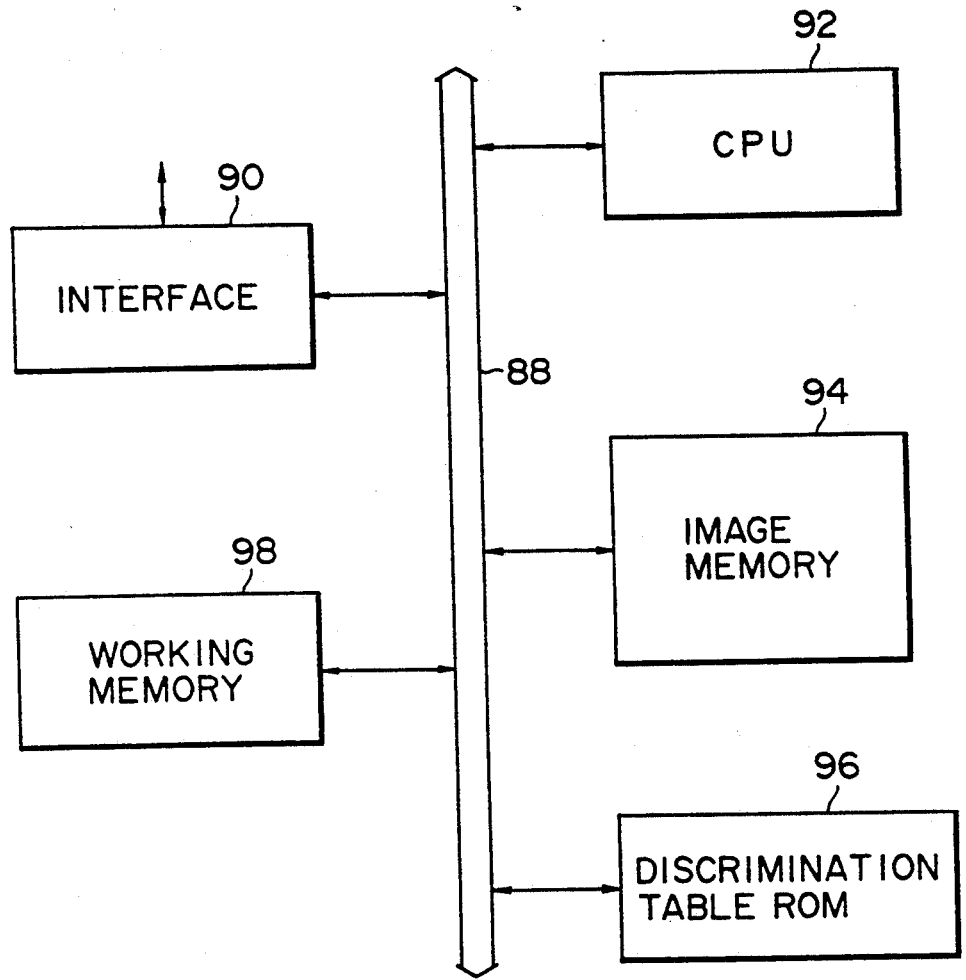
FIG. 11 is a block diagram of an image processing apparatus according to the fourth embodiment of the present invention.

FIG. 11 is a block diagram showing an arrangement of the fourth embodiment. The fourth embodiment aims at estimating halftone image data from digital image data by means of software. This embodiment includes an interface 90 for inputting and outputting image data, a CPU 92 for performing main estimation processing, an image memory 94, a discrimination table ROM 96, a working memory 98, and a bus 88 for connecting the interface 90, the CPU 92, the image memory 94, the discrimination table ROM 96, and the working memory 98. The image memory 94 stores digital image data input from an external device through the interface 90. The CPU 92 reproduces a halftone image from the image data stored in the image memory 94 by the following processing.

Figure 12:
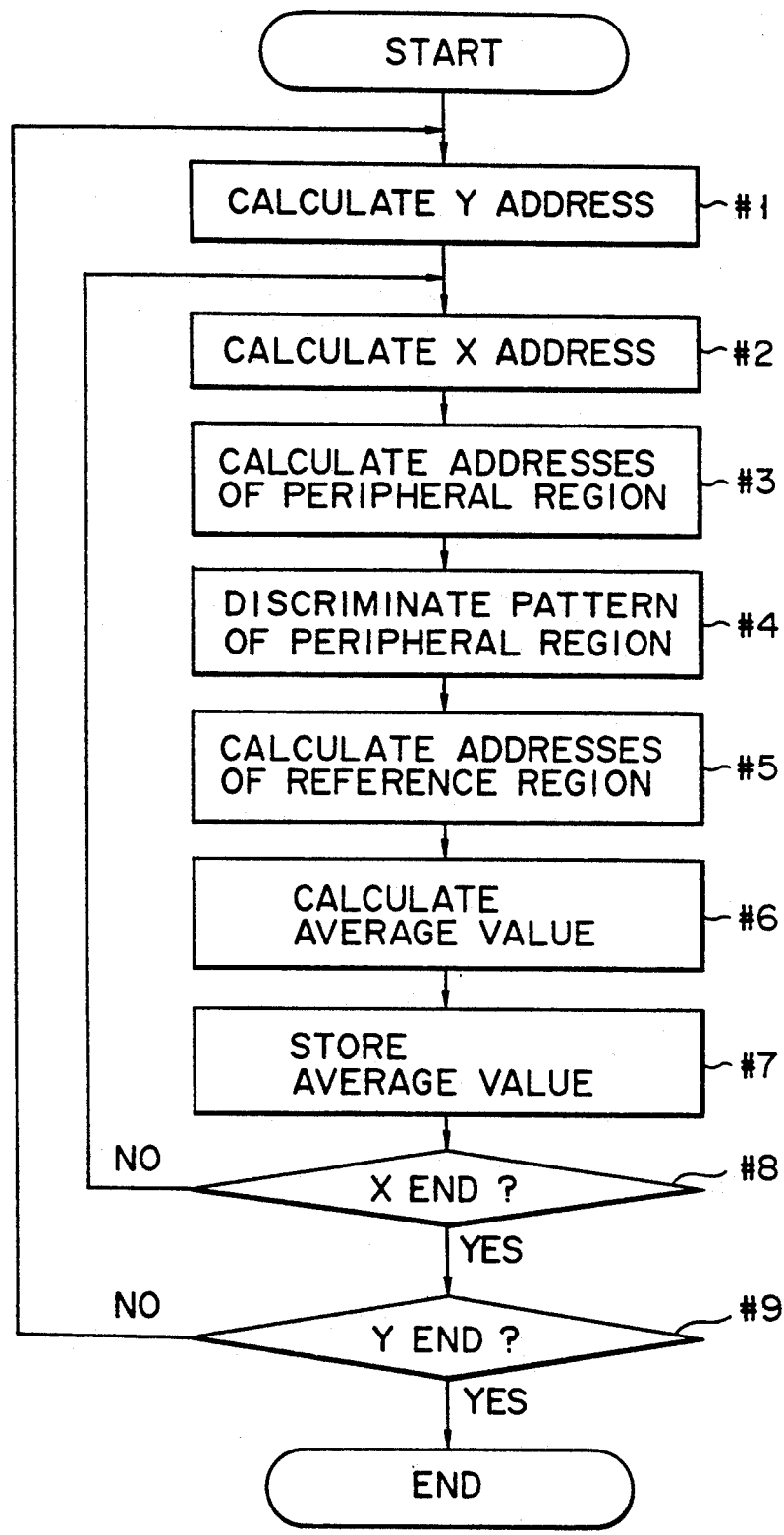
FIG. 12 is a flow chart for explaining an operation of the fourth embodiment.

An operation of the CPU 92 will be described with reference to a flow chart in FIG. 12. In step #1, the CPU 92 calculates a Y address of a pixel of interest for estimating a halftone image within the entire image. In step #2, the CPU 92 calculates an X address of the pixel of interest. In step #3, the CPU 92 calculates coordinates of the pixels of the peripheral pixel region for determining the type of image to which the pixel of interest belongs. In step #4, image data of the pixels of the peripheral pixel region are read out, and the readout data are arranged in a one-dimensional array. The one-dimensional array of readout data is supplied to the ROM 96 as an address, thereby discriminating the type of image pattern of the peripheral pixel region to which the pixel of interest belongs. This discrimination result corresponds to the aperture size of the reference region including the pixel of interest. Therefore, in step #5, the aperture size of the reference region is determined on the basis of the aperture size to obtain coordinates of the pixels within the reference region. In step #6, pixel data of these coordinates are read from the input image, and the readout pixel data within the reference region are added to each other. The sum is divided by the number of pixels within the reference region to obtain an estimated or averaged value of the halftone density of the pixel of interest. In step #7, the result is written in the working memory 98, and processing of one page stored in the image memory 94 is completed. As shown in steps #8 and #9, the above operations are repeated for all the pixels of the images stored in the image memory 94. When estimation processing from the bilevel image to the halftone image by the CPU 92 is completed, enlargement/reduction processing may be performed by the CPU 92 as needed.

According to the fourth embodiment, the halftone image can be estimated by software using the method employed in the first to third embodiments.

In the above embodiments, the ROM table in the pseudo halftone image detector is statistically formed by the ratios of the cumulative values of the frequency of occurrence of dot patterns obtained upon scanning of sample images. However, an image discrimination table may be formed by using images obtained from character or halftone images by dither processing.

In the above embodiments, the type of image is discriminated in accordance with variance of pixels, and the input image can be discriminated as being a bilevel or pseudo halftone image. However, in the above embodiments, the input image cannot be discriminated as being a dither or error diffusion image. Since a dither image has the same cyclic pattern structure as that of a dither matrix, the digital image data can be discriminated as being a dither image on the basis of the cycle of the image pattern, as will be described in the following embodiment.

Figure 13:
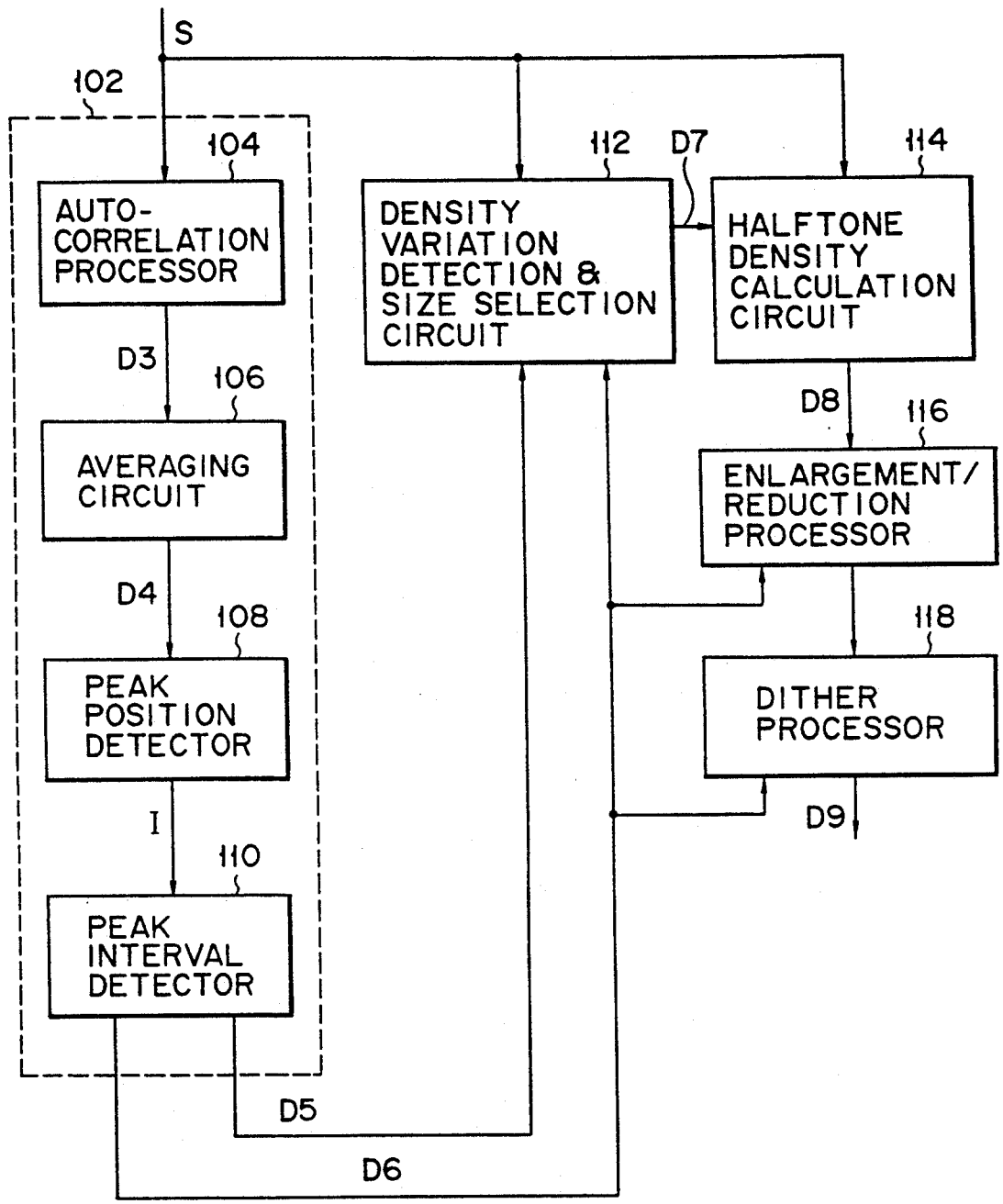
FIG. 13 is a block diagram of an image processing apparatus according to the fifth embodiment of the present invention.

FIG. 13 is a block diagram of the fifth embodiment. Digital image data S is input to a dither image detector 102, a density variation detection & size selection circuit 112, and a halftone density calculation circuit 114. The dither image detector 102 checks an input image pattern to discriminate whether the input image image detector 102 detects a cycle of the input image pattern when the input image is discriminated as being a dither image. A discrimination result D6 and a detected cycle D5 are input to the density variation detection & size selection circuit 112. The density variation detection & size selection circuit 112 detects a variation in density of each pattern of the input image on the basis of the detected cycle D5. A detection result is input to the halftone density calculation circuit 114 as an aperture size selection signal D7. The halftone density calculation circuit 114 averages the image data S within the reference region having an aperture size determined by an output D7 from the density variation detection & size selection circuit 112. The halftone density calculation circuit 114 estimates and outputs a halftone density value. An output D8 from the halftone density calculation circuit 114 is output as dither image data D9 through an enlargement/reduction processor 116 and a dither processor 118.

The dither image detector 102 comprises an auto-correlation processor 104 for obtaining an auto-correlation value D3 of the image data of each pixel on each scanning line of the input image data S, an averaging circuit 106 for obtaining an average value of auto-correlation values of N lines and defining the averaged N-line auto-correlation value a an auto-correlation value D4 of the pixel, a peak position detector 108 for detecting a pixel position I of a maximum value (peak) of the auto-correlation value on each line from the auto-correlation value D4 of each pixel thus obtained, and a peak interval detector 110 for detecting an interval or cycle of the peak positions I and outputting a discrimination signal D6 representing whether or not the input image is a dither image on the basis of the discrimination result and a peak interval signal D5 representing a cycle if the cycle is detected.

The image data input to the auto-correlation processor 104 is subjected to auto-correlation processing. As shown in FIG. 14, the auto-correlation processor 104 comprises first to third serial-in/parallel-out (8 bits) registers 122, 124, and 126, input and output selectors 128 and 130 for controlling input and output selection operations of the second and third registers 124 and 126, a selector controller 132 for controlling selection operations of the selectors 128 and 130, and a comparator 134 for comparing an output from the first register 122 with a output from the output selector 130 to obtain an auto-correlation value.

Figure 15:
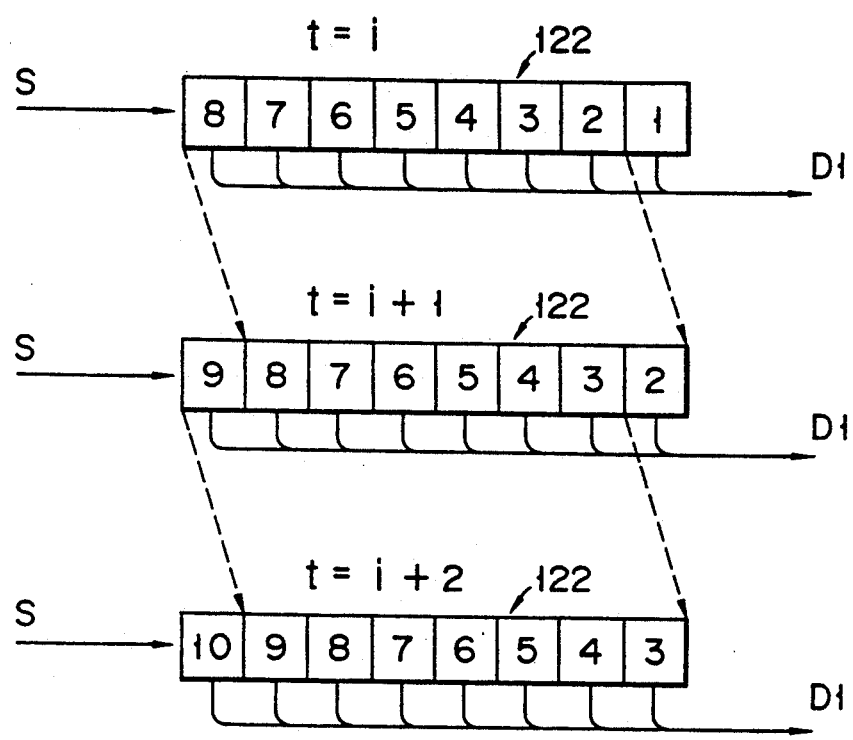
FIG. 15 is a diagram showing an operation of a first register in the auto-correlation processor of the fifth embodiment.
Figure 16:
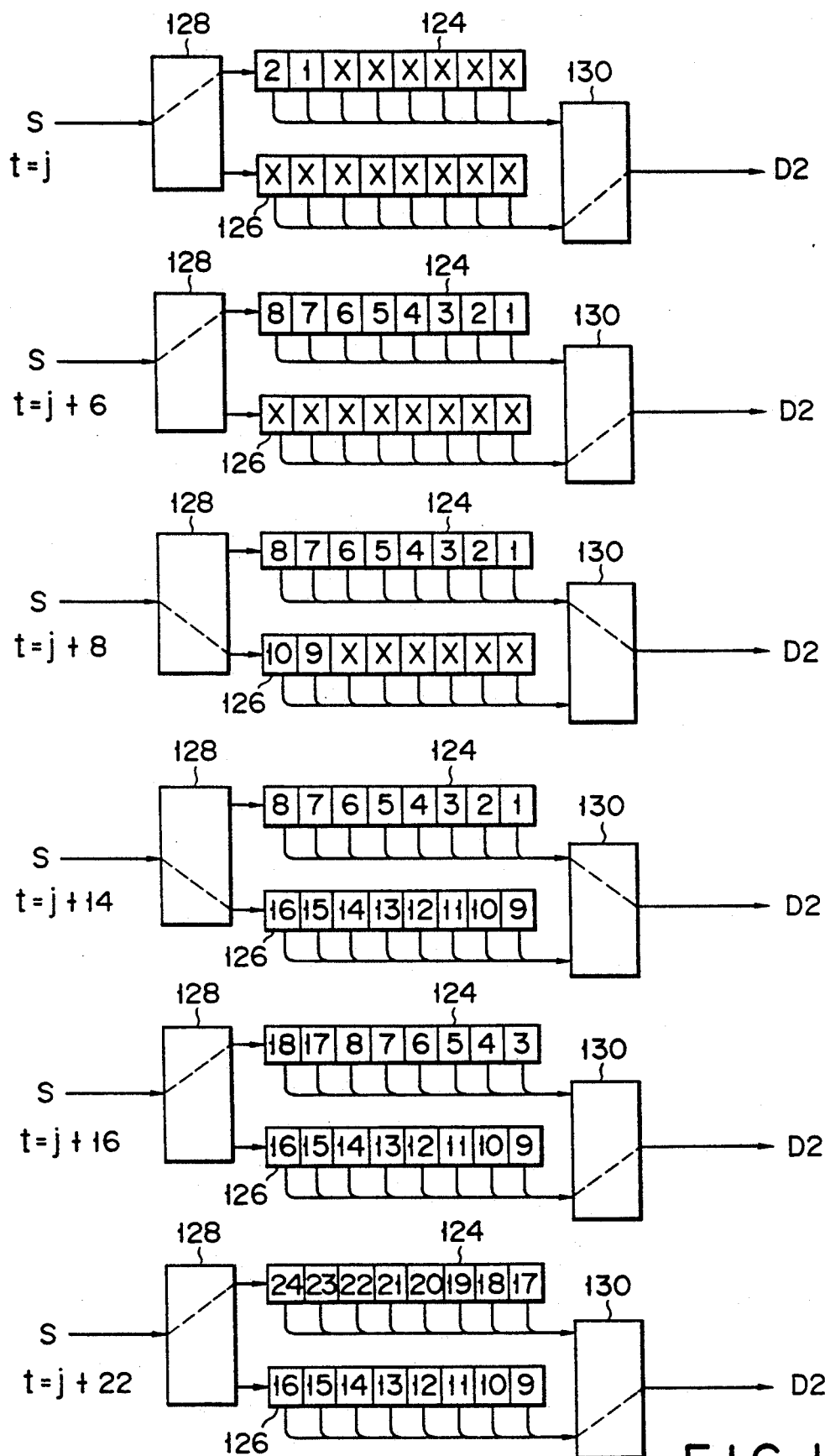
FIG. 16 is a diagram showing operations of second and third registers in the auto-correlation processor of the fifth embodiment.

As shown in FIG. 15, the first register 122 receives the serial data S on the scanning line of the input image bit by bit and outputs 8-bit parallel pixel data D1. The second and third registers 124 and 126 comprise 8-bit registers having the same function as the first register 122. As shown in FIG. 16, the second and third registers 124 and 126 are arranged such that one of the second and third registers 124 and 126 inputs the data and shifts the input signal by one bit in response to the operation of the input selector 128 while the other of the second and third registers 124 and 126 is selected by the output selector 130 to output 8-bit parallel pixel data D2. With the above arrangement, for example, when the first to eighth 8-bit pixel data are stored in the second register 124 ($t=j+6$), these pixel data D2 are output eight times. During this period ($t=j+7$ to $t=j+14$), the ninth to 16th 8-bit pixel data stored in the third register 126 are output as parallel data ($t=j+22$ to $t=j+29$).

Figure 17:
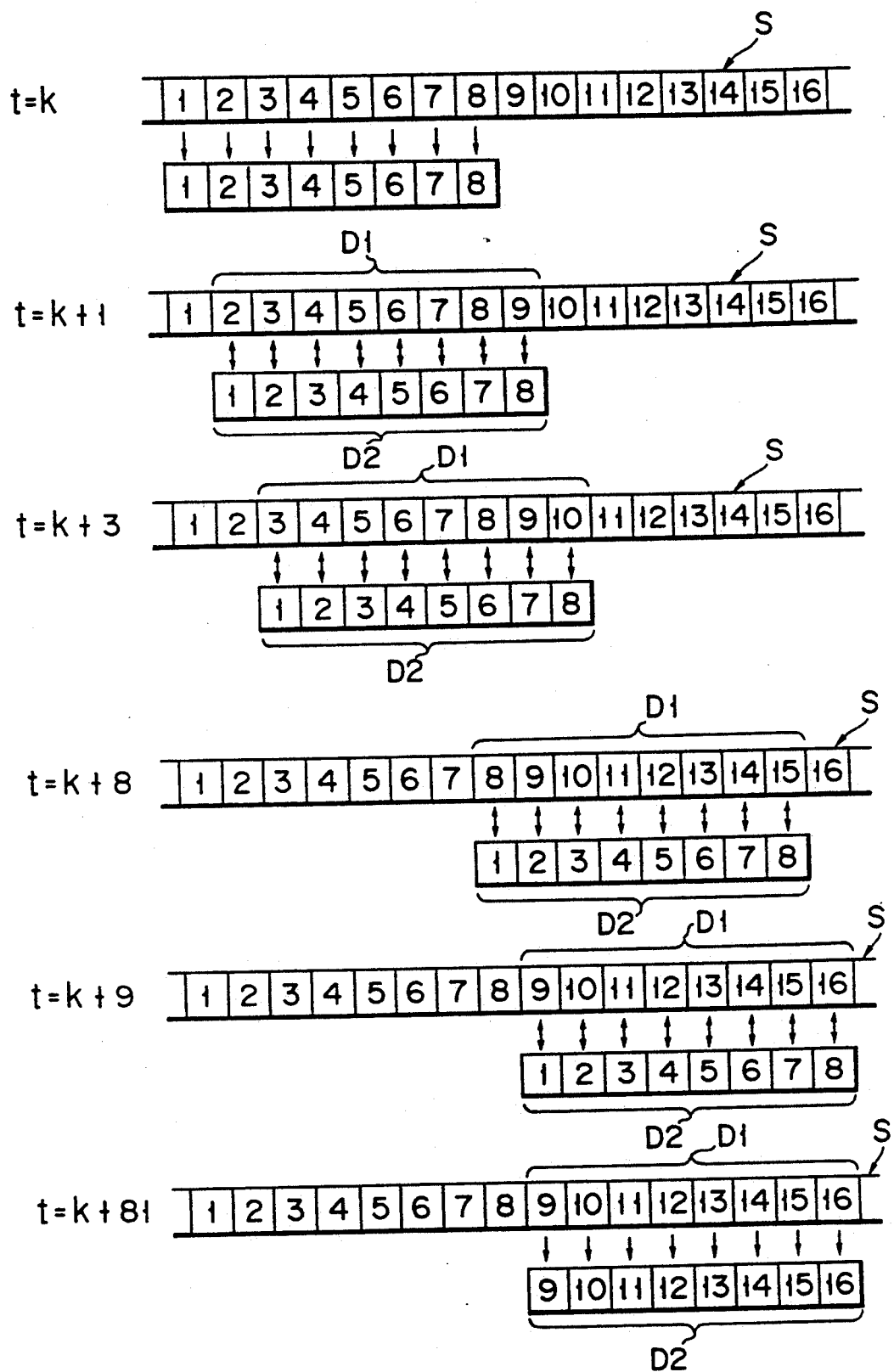
FIG. 17 is a view showing the principle of the auto-correlation processor of the fifth embodiment.
Figure 18A:
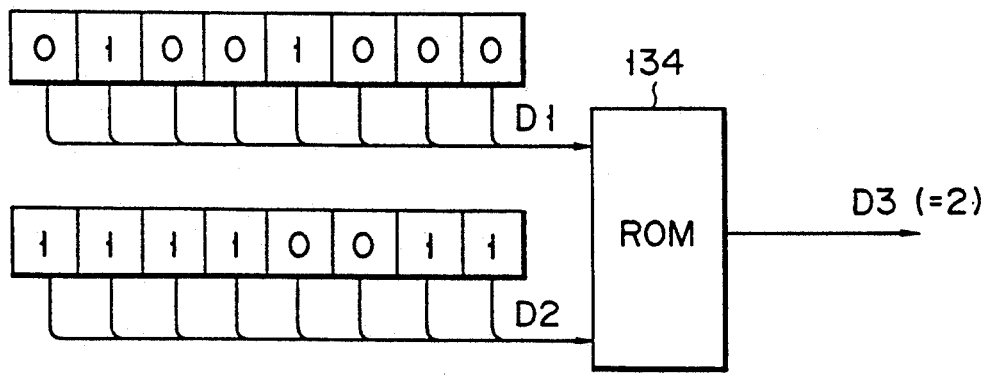
FIGS. 18A to 18C are diagrams showing operations of a comparator in the auto-correlation processor of the fifth embodiment.
Figure 18B:
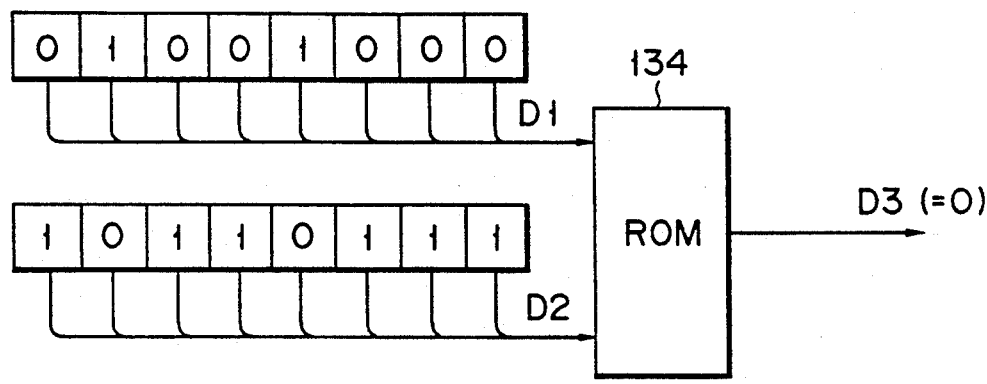
Figure 18C:
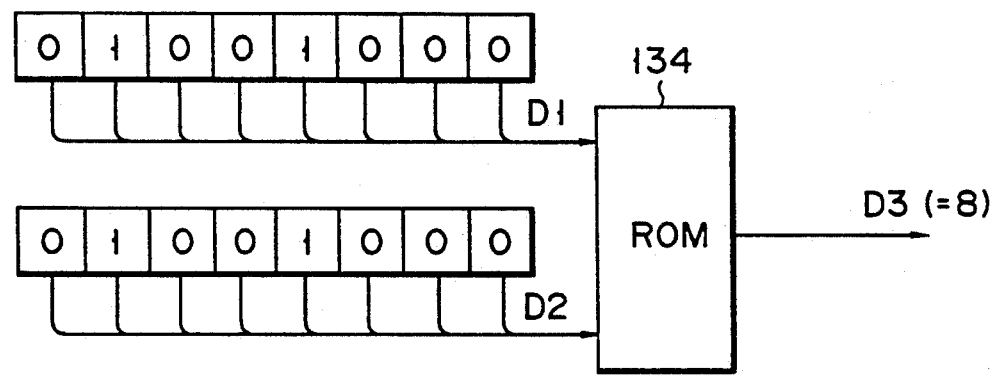
Figure 19A:
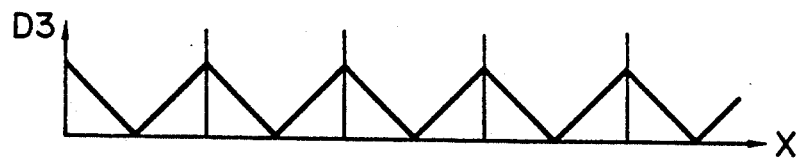
FIGS. 19A to 19E are views showing patterns of auto-correlation values.
Figure 19B:
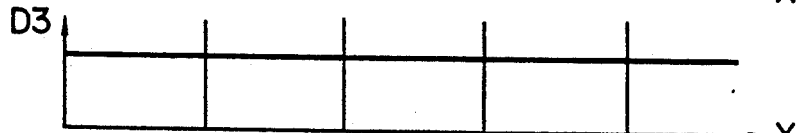
Figure 19C:
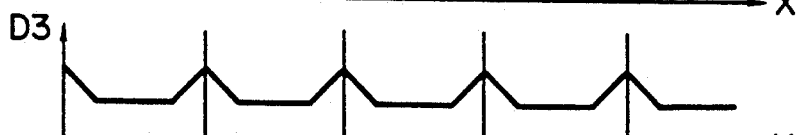
Figure 19D:
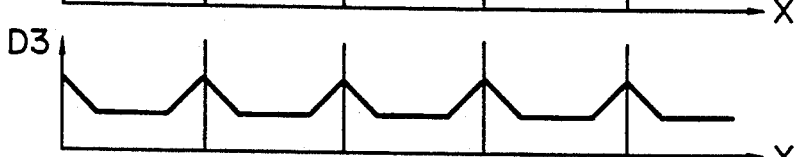
Figure 19E:
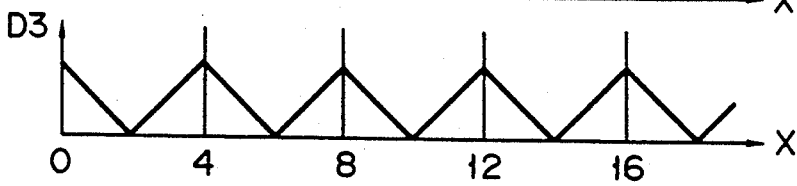
Figure 20A:
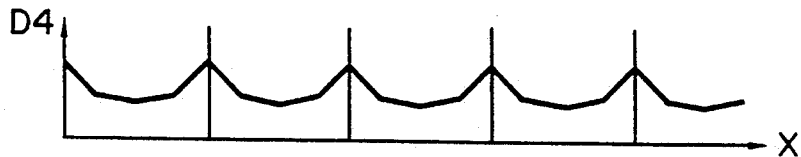
FIGS. 20A to 20E are views showing results obtained by averaging the auto-correlation values of four lines shown in FIGS. 19A to 19E.
Figure 20B:
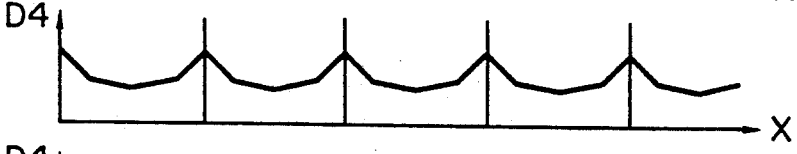
Figure 20C:
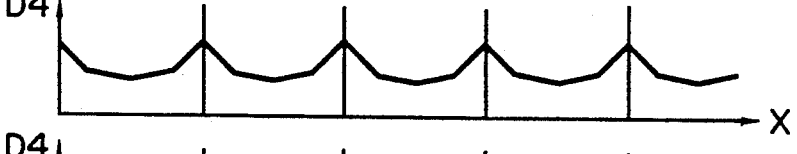
Figure 20D:
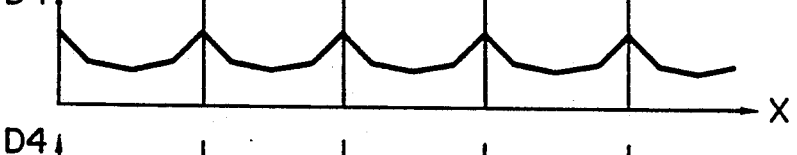
Figure 20E:
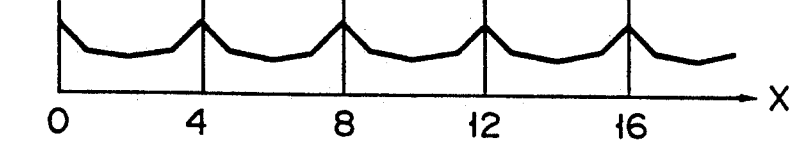

By the above operations of the first to third registers 122, 124, and 126, as shown in FIG. 17, input image data are compared with each other in units by 8 bits. The pixel data from the first register 122 is updated every bit. The pixel data D2 from the second or third register 124 or 126 is updated in units of eight bits for every eight bits. Therefore, this operation is equivalent to an operation wherein the eight-bit data are sequentially shifted in units of eight bits, i.e., 0, 1, 2, . . . 7 bits, to perform comparisons. The auto-correlation value of the input image is obtained by the number of bits obtained when the pixel data D1 coincides with the pixel data D2. For example, in the case of FIG. 18A, two bits coincide with each other. In the case of FIG. 18B, there is no coinciding bits. In the case of FIG. 18C, all bits coincide with each other. Therefore, auto-correlation signals D3 in FIGS. 18A to 18C represent 2, 0, and 8, respectively. The comparator 134 can be constituted by a ROM table which stores the above input/output relationship.

When an input image has a cyclic pattern, i.e., when the input image is a dither image, the auto-correlation signal D3 obtained by the above processing also has a cyclic pattern. For example, when image data obtained by expressing a uniform density image as a pseudo halftone image by using a 4×4 dither matrix, auto-correlation value signals D3 for five lines have peak values every four pixels, as shown in FIGS. 19A to 19E. In this case, even if only one line is taken for an example, an accurate cyclic structure cannot be obtained. Since a dither image has a two-dimensional pattern structure, only part of the cyclic structure can be obtained by one line. For example, there is no cyclic pattern in the line shown in FIG. 19B.

The auto-correlation value signals D3 of the respective lines obtained by the auto-correlation processor 104 are input to the averaging circuit 106, and the averaging circuit 106 calculates an average value D4 of the auto-correlation value signals D3 of N lines. If a dither matrix cycle is given as 4, and the number of lines subjected to averaging is given as 4, the signals D3 shown in FIGS. 19A to 19E can be averaged, as shown in FIGS. 20A to 20E, respectively, thereby allowing extraction of the cyclic pattern structure from a more macroscopic point of view. The resultant auto-correlation value signal D4 is input to the peak position detector 108.

The peak position detector 108 sequentially detects peak positions of the auto-correlation value signals D4 output from the line averaging circuit 106 according to the flow chart shown in FIG. 21. In this flow chart, $R(X)$ represents the auto-correlation value D4 at a pixel position X. In step #11, the pixel position X is reset, and at the same time, the auto-correlation value $R(X)$ is substituted into a variable Rtmp. In step #12, the pixel position X is incremented by one in order to obtain an auto-correlation value corresponding to the next pixel. In step #13, an auto-correlation value $R(X)$ at the updated position is compared with the variable Rtmp. If the auto-correlation value $R(X)$ is smaller than the variable Rtmp, the auto-correlation value $R(X)$ is stored in the variable Rtmp in step #14, and the flow returns to step #12. In this manner, a minimum value of the auto-correlation values $R(X)$ is stored in the variable Rtmp in steps #12 to #14. When the variable Rtmp is auto-correlation value $R(X)$ in step #13, the minimum value is stored in the variable Rtmp. A maximum value of the auto-correlation values is then calculated.

In step #15, the updated auto-correlation value $R(X)$ is substituted into the variable Rtmp. In step #16, in order to obtain an auto-correlation value $R(X)$ of the next position, the pixel position X is incremented by one. In step #17, the variable Rtmp is compared with the auto-correlation value $R(X)$. If the auto-correlation value $R(X)$ is not smaller than the variable Rtmp, the flow returns to step #15, and this auto-correlation value $R(X)$ is substituted into the variable Rtmp. The operations in steps #15 to #17 are repeated until the variable Rtmp becomes larger than the auto-correlation value $R(X)$. When the variable Rtmp is larger than the auto-correlation value $R(X)$ in step #17, a pixel at a pixel position X−1 is discriminated as being a pixel representing a maximum auto-correlation value. In step #18, the pixel position X−1 is substituted into a variable I, and the peak position signal I is output in step #19. The flow returns from step #20 to step #12 to detect a pixel position of the next maximum auto-correlation value, and the above operations are repeated.

Figure 22A:
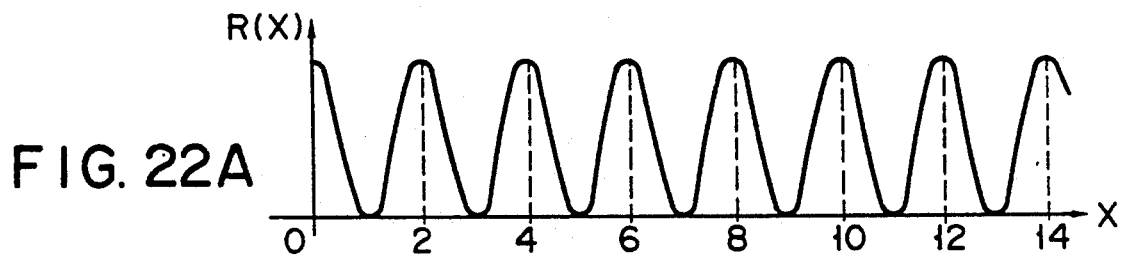
FIGS. 22A to 22E are views showing peak position detection results.
Figure 22B:
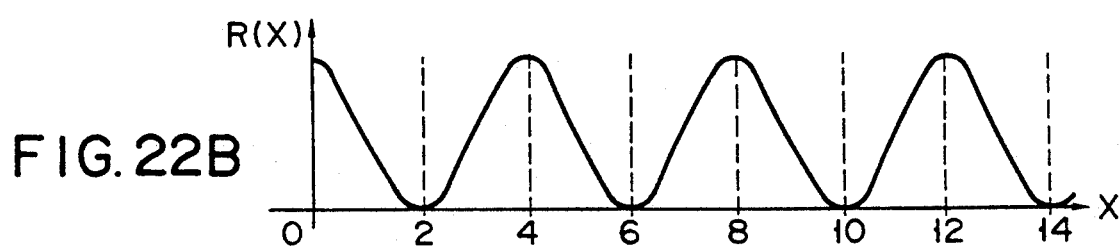
Figure 22C:
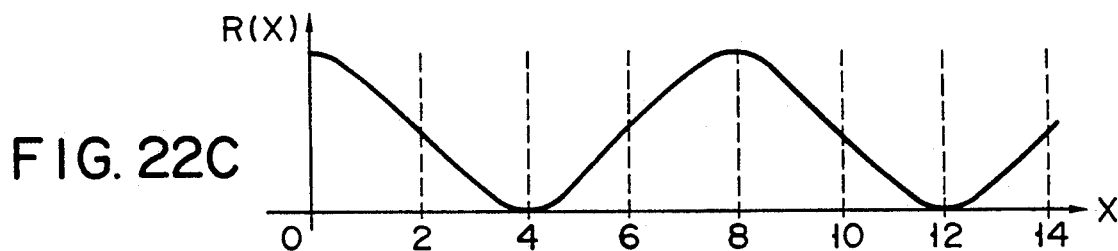
Figure 22D:
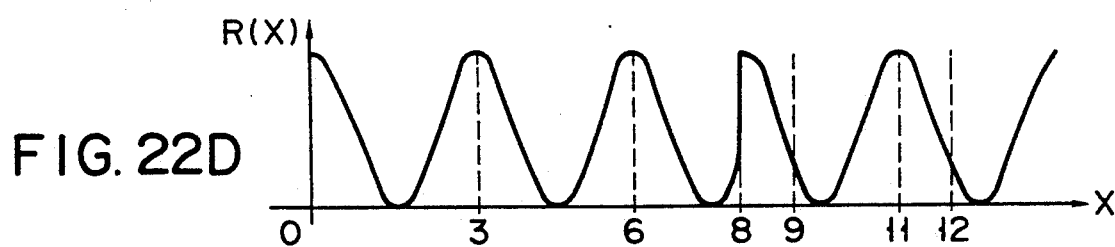
Figure 22E:
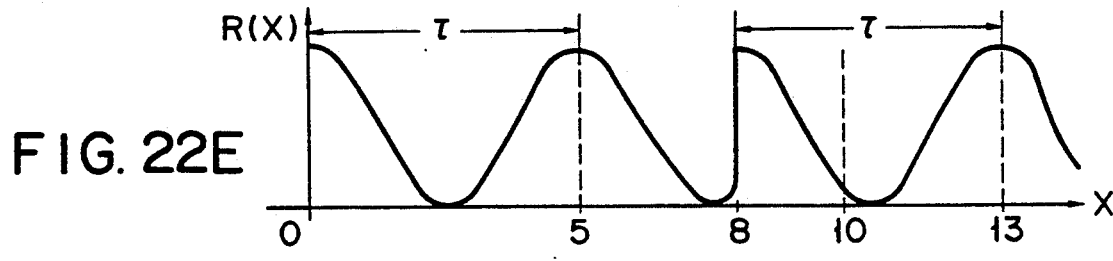

When the peak positions are obtained, whether or not the cyclic pattern is present (i.e., whether or not the image is a dither image) is detected in accordance with whether or not the interval of the peak positions is constant. Therefore, the dither image pattern can be detected on the basis of the detected interval. Since an auto-correlation value is obtained every eight pixels in the auto-correlation processor 104 as described above, the peak of the auto-correlation value appears every eight pixels regardless of the cycle of the dither image. That is, if a dither matrix pattern is constituted by 2×2 pixels, the peak positions of the auto-correlation values are repeated at equal intervals, as shown in FIG. 22A; and if by 4×4 and 8×8 pixels, in FIGS. 22B and 22C, respectively. However, if a dither matrix pattern is constituted by 3×3 and 5×5 pixels, the peak position intervals are not equal to each other, as shown in FIGS. 22D and 22E, respectively. In order to eliminate this drawback, after the peak position detector 110 calculates a peak interval, this interval is used without modifications if three or more peak positions are present between eight pixels or a peak interval is 2, 4, or 8. Otherwise, as shown in FIG. 22E, a distance $\tau$ from the 0th, 8th, 16th pixels, ... to the next peak is checked, thereby detecting a cycle free from mismatching of the auto-correction value distribution obtained every eight pixels. When three adjacent peaks are extracted and have equal intervals upon detection of the pattern, a portion between the first and second peaks is discriminated as being a dither image. The peak position detector 110 outputs a peak interval signal D5 representing a distance between the first and second peaks and a discrimination signal D6 representing that the image is a dither image. Otherwise, the peak position detector 110 discriminates that the input image does not have any cycle and cannot be a dither image. In this manner, the dither image detector 102 can detect that the input image is a dither image. These discrimination results are utilized by the density variation detection & size selection circuit 112, the enlargement/reduction processor 116, and the dither processor 118, all of which process an input image in practice.

The density variation detection & size selection circuit 112 and the halftone density calculation circuit 114 perform processing for estimating a halftone image from an input image. The density variation detection & size selection circuit 112 receives an input image, a peak interval signal D5, and a discrimination signal D6, detects a variation in density of the image data in units of the dither matrix pattern, and determines an aperture size of the reference region for averaging the input image on the basis of the detection result, the discrimination signal D6, and the peak interval signal D5. Assume that an input image is a dither image. If a variation in density is small, a size equal to the dither matrix pattern is selected. If the variation in density is large, a size smaller than the pattern is selected in order to reproduce sharpness of the input image. However, if the input image is not a dither image, the minimum (1×1) aperture size is selected in order to output the input image intact.

Figure 23:
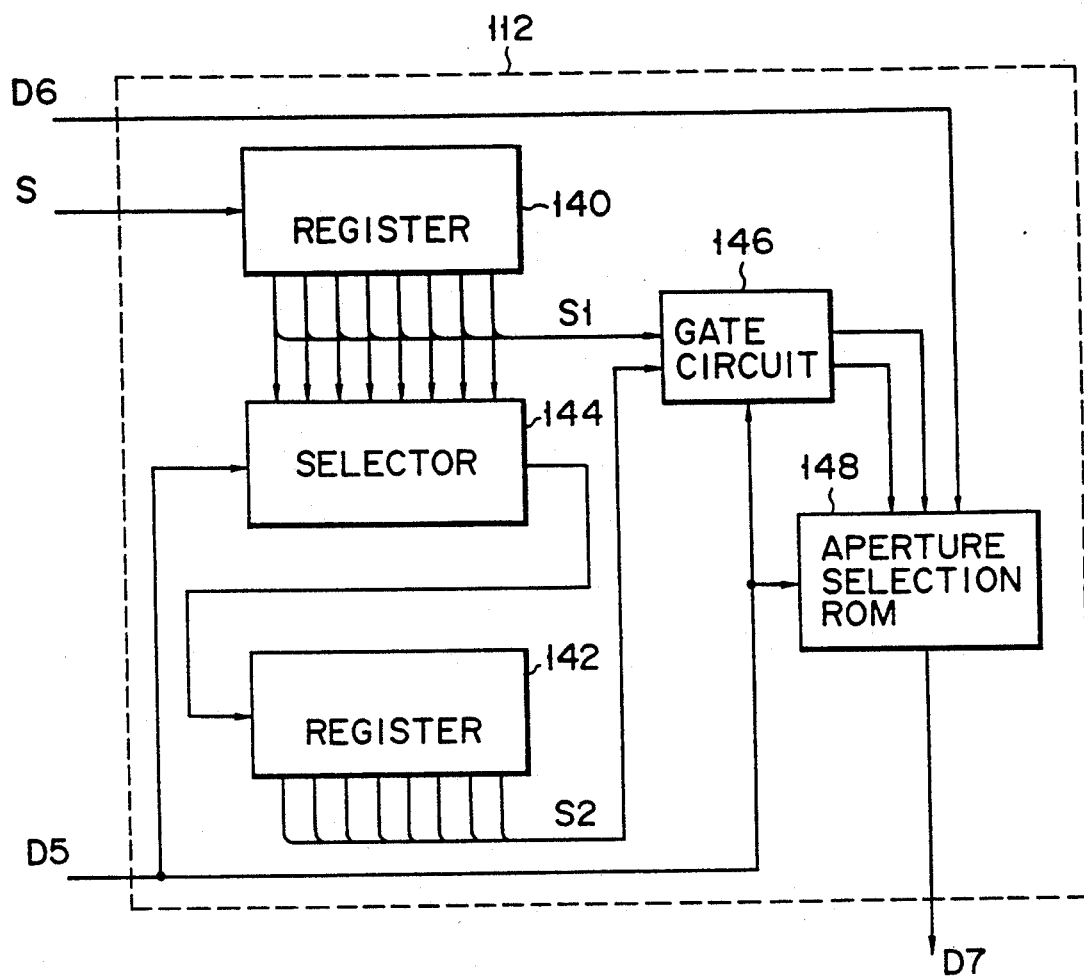
FIG. 23 is a block diagram showing a detailed arrangement of a density variation detector of the fifth embodiment.
Figure 24:
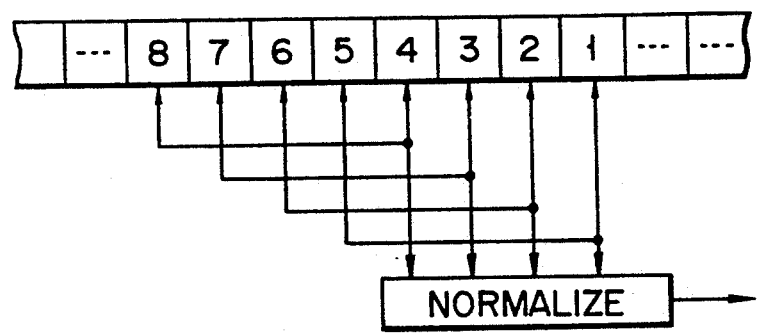
FIG. 24 is a view showing an operation of the density variation detector of the fifth embodiment.

As shown in FIG. 23 the density variation detection & size selection circuit 112 comprises serial-in/parallel-out (8 bits) registers 140 and 142, a selector 144, a gate circuit 146, and an aperture selection ROM 148. The register 140 serially receives the data S on one scanning line of the input image bit by bit and converts the input data S into 8-bit parallel pixel data S1. The selector 144 delays the image data stored in the register 140 by a peak interval represented by the peak interval signal D5 and writes the delayed image data in the register 142. The selector 144 selects one of the bit outputs from the register 140 and supplies the selected bit output to the register 142. The register 142 comprises an 8-bit register having the same data S1 and S2 from the registers 140 and 142 and the peak interval signal D5 are input to the gate circuit 146. The gate circuit 146 supplies the data S1 and S2 as address signals to the aperture selection ROM 148 every timing corresponding to the peak distance represented by the peak interval signal D5. The data in the aperture selection ROM 148 denotes the number of coinciding bits between the image data S1 and the image data S2. For example, the peak interval signal D5 (dither image pattern) represents 4, the ROM 24 outputs an aperture size selection signal D7 corresponding to the number obtained by normalizing the number of identical pixels with the peak interval signal D5, the signal D7 obtained by substantially comparing each pixel data on the scanning lines constituting the input image with data spaced apart from the pixel data by four bits, as shown in FIG. 24.

The aperture size selection signal D7 determined by the ROM 148 in accordance with the peak interval, the discrimination result, and the detection result representing a variation in density in units of peak intervals is supplied to the halftone density calculation circuit 114. The halftone density calculation circuit 114 determines an aperture size for averaging the image data, thereby performing averaging.

Figures 25, 26:
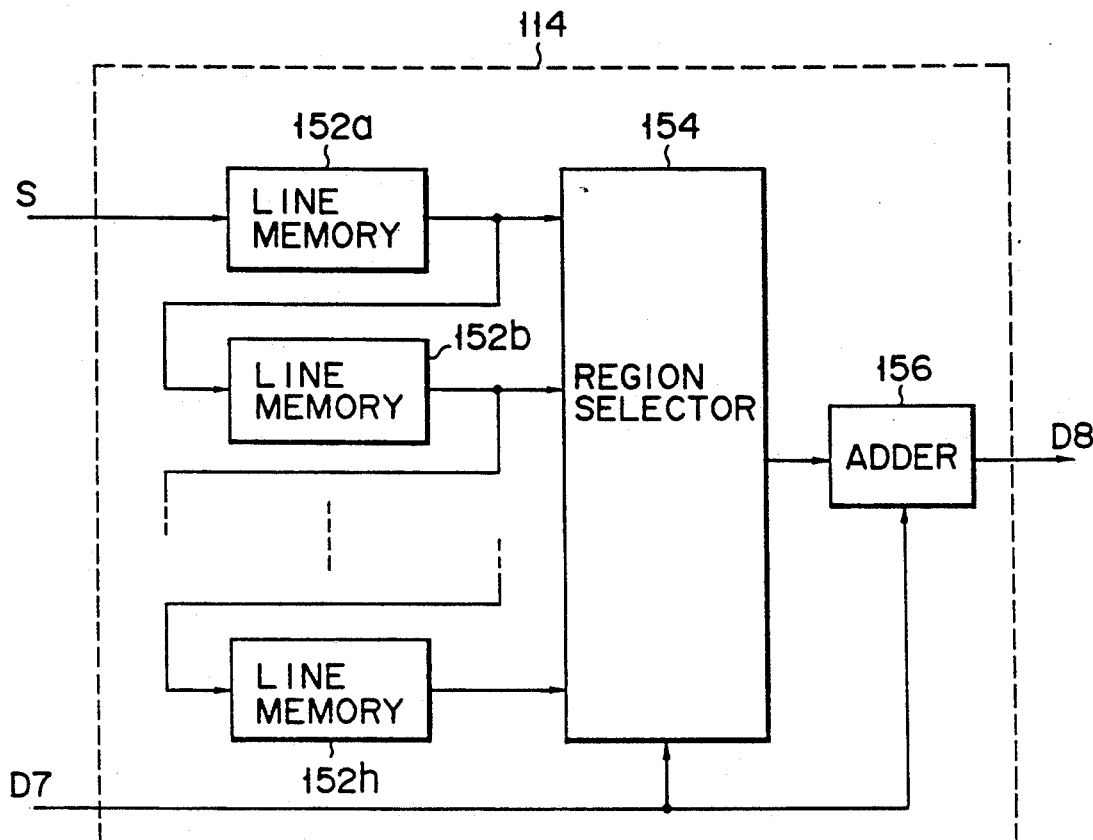
FIGS. 25 is a block diagram showing a detailed arrangement of the halftone density calculation circuit of the fifth embodiment.
FIG. 26 is a view showing a reference region used for calculating a halftone density.

As shown in FIG. 25, the halftone density calculation circuit 114 comprises eight line memories 152a to 152h connected in series with each other, a region selector 154 for selecting data within the averaging reference region determined on the basis of the aperture size selection signal D7 by using the outputs from the line memories 152a to 152h, and an adder 156 for counting the number of black or white pixels of the image data of the reference region selected by the selector 154, dividing the count by the aperture size of the reference region, and outputting the quotient as a halftone density D8. The selector 154 selects the inputs as follows. Assume that the aperture size selection signal D7 output from the density variation detection & size selection circuit 112 takes a value of 0 to 8. If the value is 0 or 1, then the aperture size is given as 1; if 2 or 3, then 2; if 4 or 5, then 3; if 6 or 7, then 4; and otherwise, 8. The selected input is supplied to the adder 156.

For example, when the aperture size selection signal D7 represents 5, a reference region having a 3×3 aperture size is determined with reference to a pixel position M5 as shown in FIG. 26. Pixel data at pixel positions M1 to M9 are output. The adder 156 counts the number of pixels, normalizes the count on the basis of the aperture size selection signal D7, and outputs the normalized result as halftone image data D8 of the pixel position M4. The halftone density calculation circuit 114 performs the above operations for the entire input image. Note that if a target image is represented as a bilevel image by the discrimination signal D6, the averaging aperture size is forced to be set as the 1×1 size by the ROM 148, and the input image is directly output.

The estimated halftone image thus obtained is appropriately enlarged or reduced by the enlargement/reduction processor 116, and the size-changed image is output. This image is converted into a dither image by the dither processor 118, and the dither image is output as a halftone image.

According to the fifth embodiment described above, the input image is subjected to auto-correlation processing in the scanning direction, and a peak value of the auto-correlation value is extracted from the average value of the auto-correlation values of several lines. An interval between the peak values is detected to discriminate whether or not the input image is a dither image. If the input image is discriminated as being a dither image, the input image is averaged by an aperture size corresponding to the dither matrix pattern, and the dither image therefore can be converted into a halftone image without generating a moire pattern. Even in a dither image, if a variation in density is large, the input image is averaged by a size smaller than the dither matrix pattern, thereby preserving the sharpness of the image. In addition, even if a bilevel image is included in the input image in addition to the dither image, these images are directly output, and reproducibility of the minute portions is not degraded.

Figure 27:
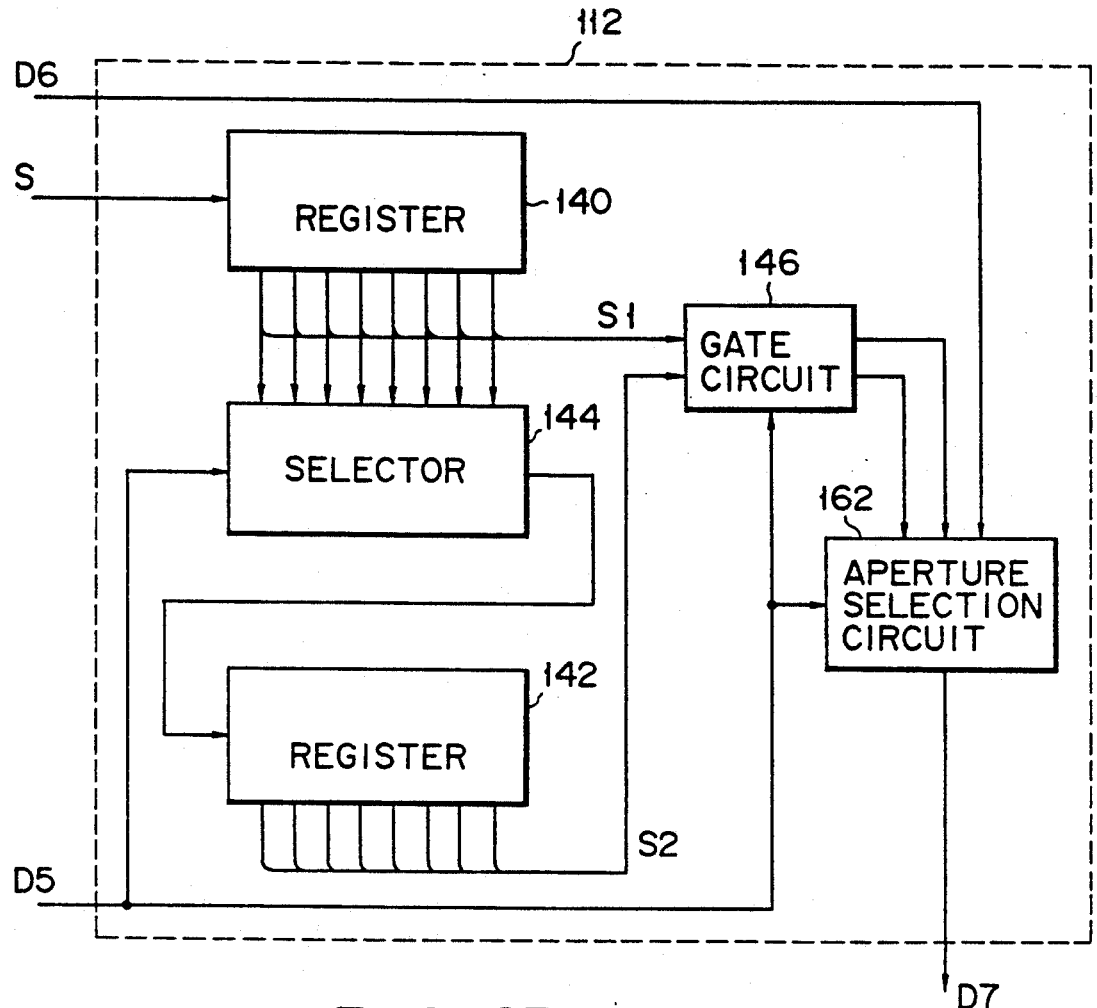
FIG. 27 is a block diagram showing a detailed arrangement of a modification of the halftone density calculation circuit.
Figure 28:
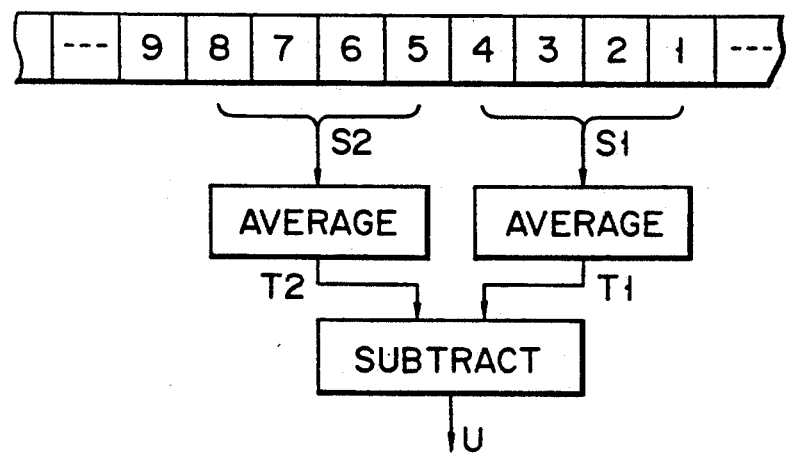
FIG. 28 is a block diagram showing another modification of the halftone density calculation circuit.

An aperture selection circuit 162 shown in FIG. 27 may be used in place of the aperture selection ROM 148 as a modification of the density variation detection & size selection circuit 112. In addition, as shown in FIG. 28, an average value T1 of the data S1 and an average value T2 of the data S2 may be obtained prior to comparison between the image data S1 and S2, thereby generating an aperture size selection signal D7 on the basis of a difference U between the average values T1 and T2. The halftone density calculation circuit 16 or 78 of the first to fourth embodiments can be used as the halftone density calculation circuit 170 of the fifth embodiment.

In the fifth embodiment, the presence or absence of the cyclic pattern is detected by the peak interval of the auto-correlation values. However, as in the ROM 34 of the pseudo halftone image detector 14 of the first embodiment, the pattern may be detected with reference to several patterns prestored in the ROM 34.

Figure 29:
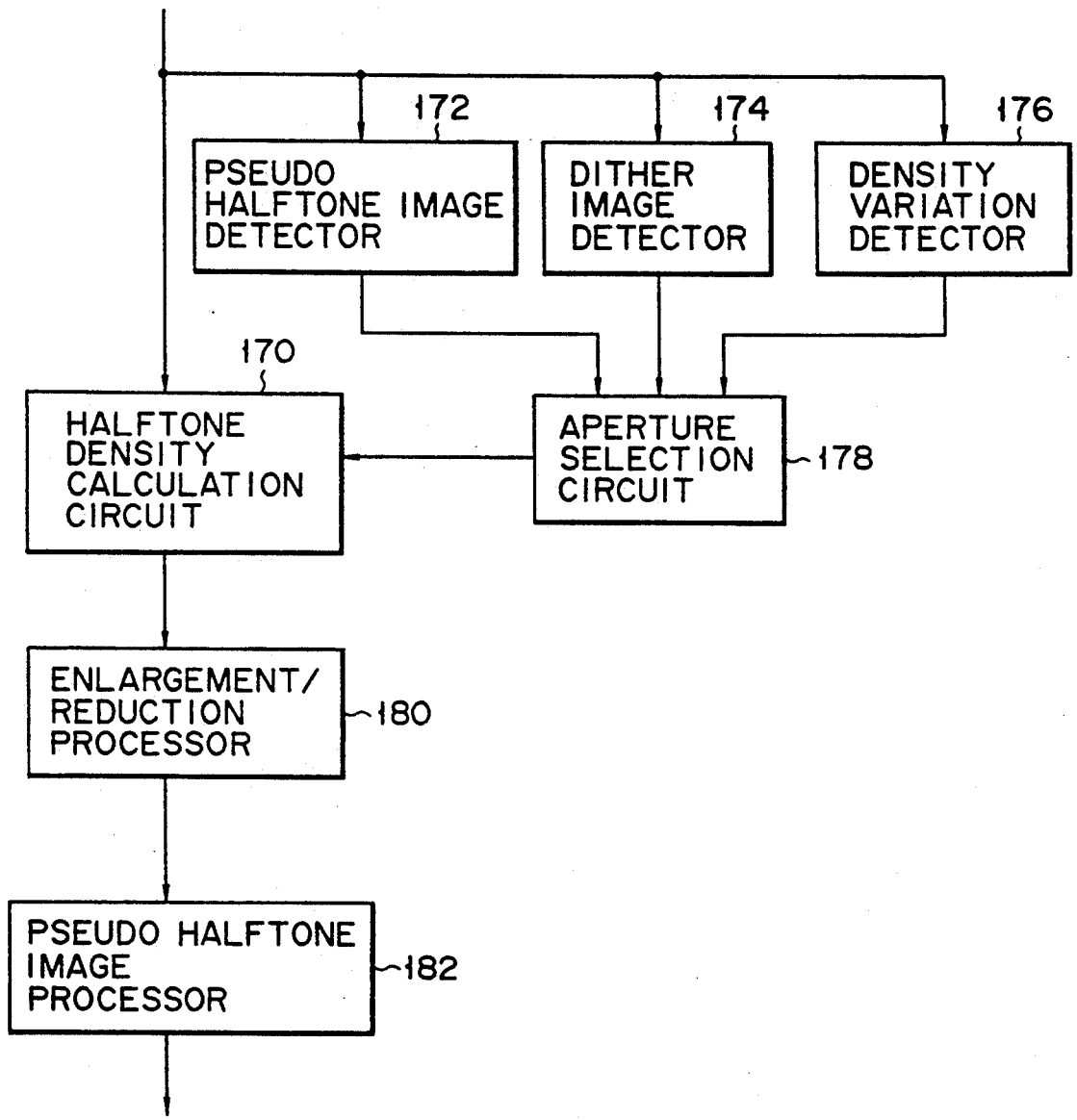
FIG. 29 is a block diagram of an image processing apparatus according to the sixth embodiment of the present invention.

In the fifth embodiment, an image discriminated not as being a dither image is processed as being a bilevel image. In this case, if input images include an error diffusion image, an accurate halftone image cannot be estimated for the error diffusion image. The following embodiment exemplifies an arrangement wherein an input image can be discriminated as being a dither image, an error diffusion image, or a bilevel image, and an optimal aperture size is selected in accordance with the discrimination result. FIG. 29 is a block diagram showing the sixth embodiment capable of the above discrimination. Digital image data is input to a halftone density calculation circuit 170, a pseudo halftone image detector 172, a dither detector 176. Detection results from the detectors 172, 174, and 176 are supplied to an aperture selection circuit 178. The aperture selection circuit 178 supplies a selected circuit 170. The halftone density calculation circuit 170 may comprise the circuit 16 (FIG. 6) of the first to fourth embodiment or the circuit 114 (FIG. 25) of the fifth embodiment. The pseudo halftone image detector 172 may comprise the detectors 14 or 76 of the first to fourth embodiments, the density variation detector 176 may comprise an arrangement of the density variation detection & size selection circuit 112 except for the aperture selection ROM 148 and the aperture selection circuit 162, and the aperture selection circuit 178 may comprise the aperture selection ROM 148 and the aperture selection circuit 162. An output from the halftone density calculation circuit 170 is output through the enlargement/reduction processor 180 and the pseudo halftone image processor 182. The enlargement/reduction processor 180 and the pseudo halftone image processor 182 have the same arrangements as in the above embodiments.

According to the sixth embodiment, the pseudo halftone image detector 172 discriminates whether an input image is a bilevel or pseudo halftone image in accordance with the degree of variance of the dot pattern of the peripheral pixel region in the same manner as in the first to fourth embodiments. The dither image detector 174 detects the presence/absence of the cyclic pattern and the cycle itself as in the fifth embodiment, thereby discriminating whether or not the input image is a dither image. The density variation detector 176 detects a variation in density of every pattern of the image data as in the fifth embodiment. When the input image is a pseudo halftone image such as a dither image having a cyclic pattern structure, the aperture selection circuit 178 determines an aperture size in accordance with the detected cycle and the output from the density variation detector 176 as in the fifth embodiment. When the input image is an error diffusion image, an aperture size suitable for the degree of variance as in the first to fourth embodiments is determined. A minimum aperture size is determined when the input image is a bilevel image. Therefore, optimal halftone images corresponding to various types of input image can be estimated.

Figure 30:
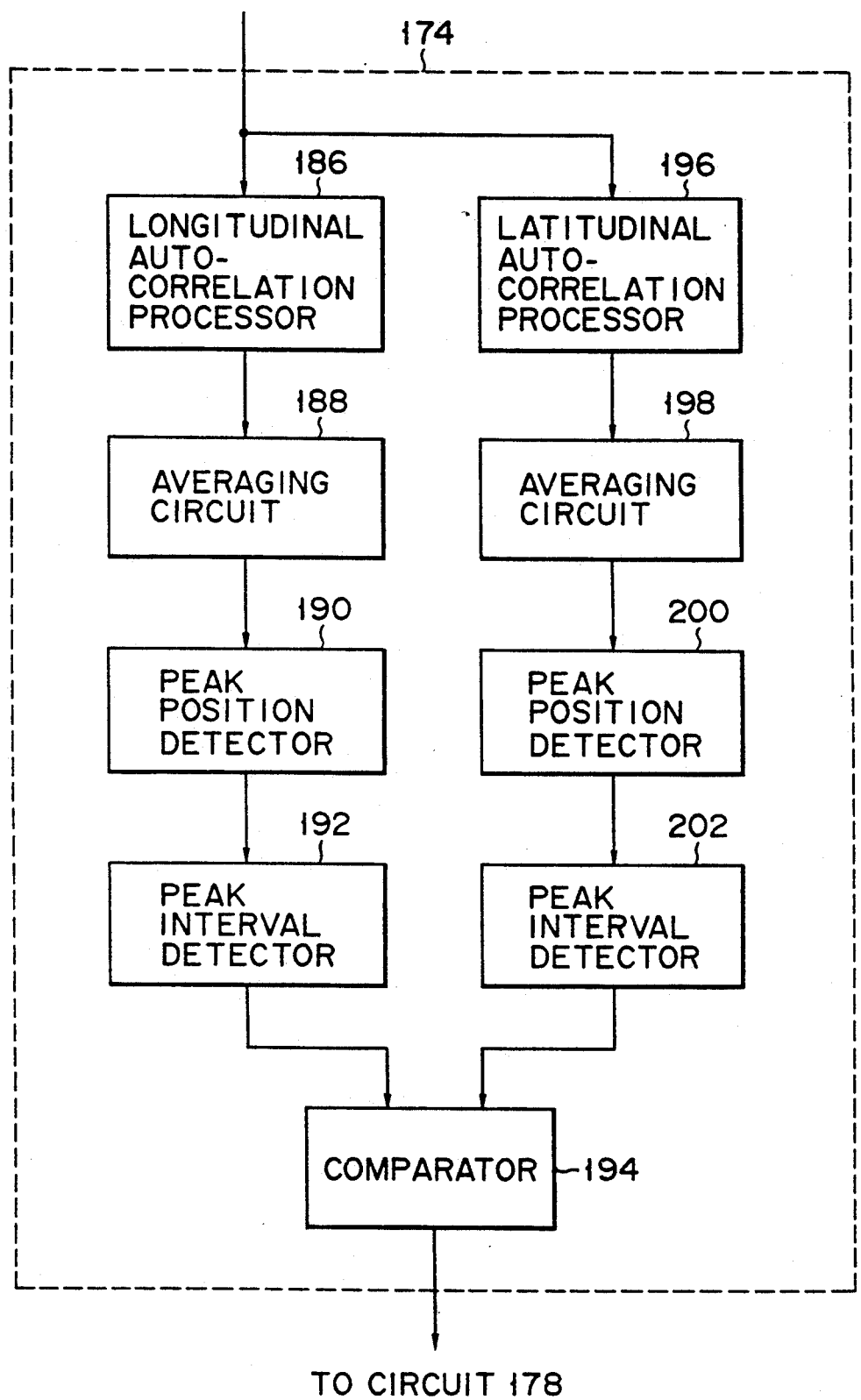
FIG. 30 is a detailed block diagram of a dither image detector of the sixth embodiment.

The respective circuits in this embodiment may be corresponding circuits of the above embodiments. However, an arrangement of the dither image detector 174 is shown in FIG. 30. The dither image detector 102 of the fifth embodiment shown in FIG. 13 performs only auto-correction processing in one direction, i.e., the main scanning direction. In order to more accurately detect a pattern structure, bidirectional auto-correction processing is performed in FIG. 30. That is, an input image is supplied to a longitudinal auto-correlation processor 186 and a lateral auto-correlation processor 196 in parallel. Outputs from the processors 186 and 196 are supplied to averaging circuits 188 and 198, peak position detectors 190 and 200, and peak interval detectors 192 and 202. Outputs from the peak position detectors 192 and 202 are supplied to a comparator 194. The comparator 194 compares detection results from the detectors 192 and 202. When a difference between these two detection results is small and a detected cycles have a value larger than a predetermined value, the comparator 194 determines that the input image has a cycle and outputs a larger detection pattern. However, when the difference between the detection outputs from the detectors 192 and 202 is large or one of the detection cycles has a value smaller than the predetermined value, the comparator 194 determines that the input image does not have a cyclic pattern and outputs a signal representing a 1×1 aperture size.

Figure 31:
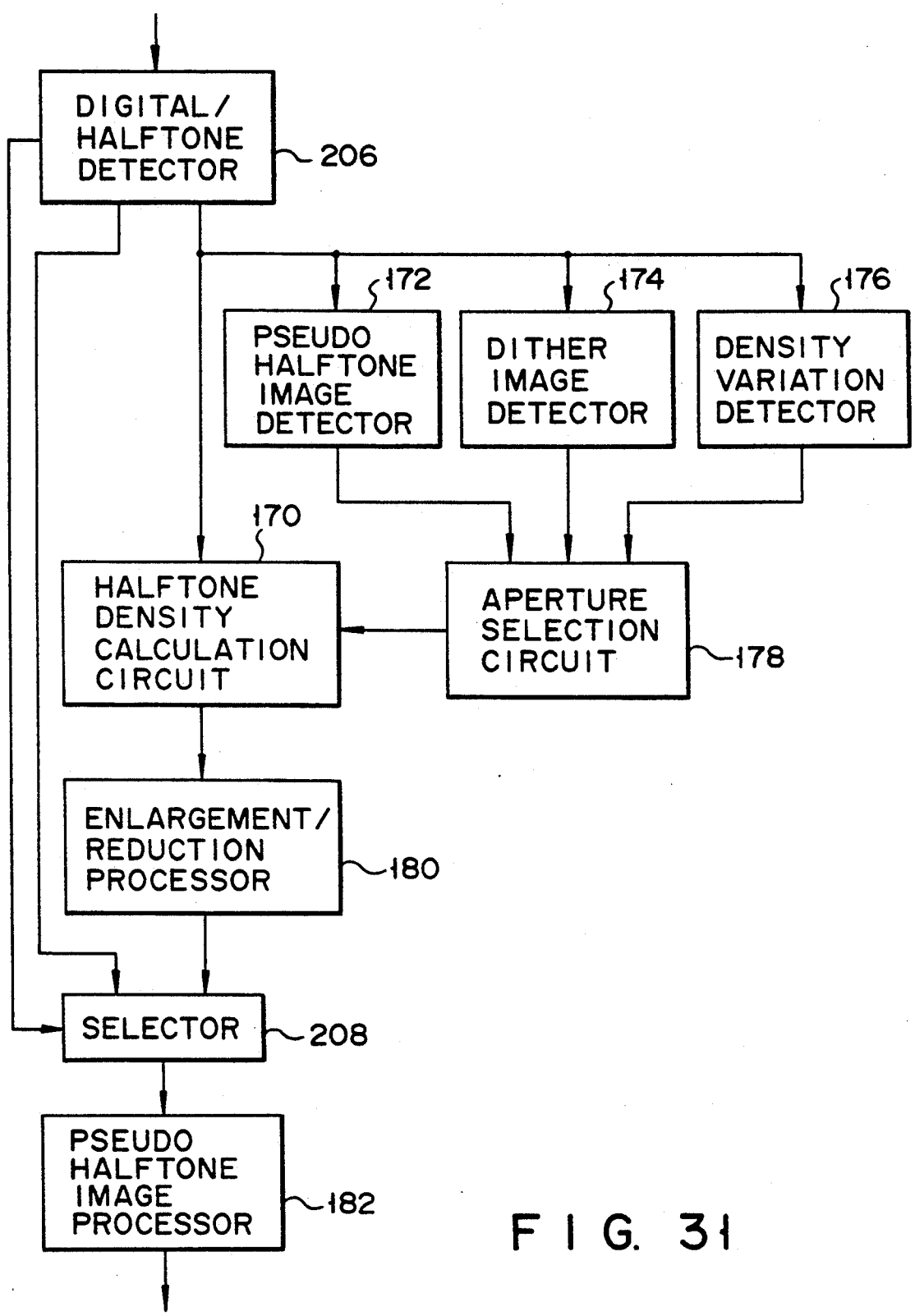
FIG. 31 is a block diagram of an image processing apparatus according to the seventh embodiment of the present invention.

FIG. 31 shows the seventh embodiment capable of processing the input image data which includes halftone image data (e.g., a photograph) in addition to the digital image data (e.g., a bilevel image and a pseudo halftone image). A digital image/halftone image discrimination detector 206 is arranged in an image input section in FIG. 29. The detector 206 detects that a histogram of the density levels (0 to 255) of each pixel and discriminates the input image as being a halftone image if the histogram is uniform and as being a digital image if the histogram is concentrated on 0 level or 255 level. The discrimination result is supplied to a selector 208 connected between the enlargement/reduction processor 180 and the pseudo halftone image processor 182. The input image data discriminated as being a halftone image is directly supplied to the selector 208 and the input image data discriminated as being a digital image is supplied to the halftone density calculation circuit 170 and the detectors 172, 174, and 176. In this embodiment, only the digital image is processed by the image processor shown in FIG. 29, and the halftone image is mixed with the output from the enlargement/reduction processor 180. If the circuit connected to the output of this processor can process the halftone image, the selector 208 is connected to the output of the pseudo halftone image processor 182 in order to combine the halftone image data and the pseudo halftone image data.

The present invention is not limited to the above embodiments. Various changes and modifications may be made within the spirit and scope of the invention. For example, the number of pixels of the peripheral pixel region, the aperture size of the reference region, and the like can be arbitrarily selected. Partial modifications described with reference to each embodiment can be applied to other embodiments. A color image may be input as color component images such as R, G, and B images, and the above operations may be performed for these input component images, thereby performing color image processing. In addition the above dither method is limited to a bilevel dither method. However, the present invention is applicable to a case wherein a pseudo halftone image obtained by multilevel dither processing can be used to estimate a halftone image.

According to the present invention, as has been described above, the aperture size of the reference region is set in accordance with types of pixel of interest, and the density of the pixel of interest can be estimated from the image data within the reference region. Therefore, there can be provided an image processing apparatus capable of maintaining excellent gradation and sharpness of the pseudo halftone image and estimating a halftone image with high precision.

What is claimed is:

1. An image processing apparatus for converting input digital image data into halftone image data, the apparatus comprising:

means for detecting a variance of pixel values within a given region including a pixel of interest in the inputted digital image data;

means for selecting a first aperture which is larger than a predetermined area if the variance is larger than a predetermined level and a second aperture which is smaller than the predetermined area if the variance is smaller than the predetermined level; and means for averaging the inputted digital image data within said aperture having a size corresponding to the variance detected by said detecting means.

2. An apparatus according to claim 1, in which said detecting means comprises:

table means for inputting a dot pattern of the given region and for outputting a similarity between the dot pattern of the given region and a dot pattern representing a pseudo halftone image or a dot pattern representing a bilevel image.

3. An apparatus according to claim 2, in which contents of said table means are determined based on a frequency of occurrence of a dot pattern obtained upon scanning of a sample representing the pseudo halftone image or a sample representing the bilevel image.

4. An apparatus according to claim 1, in which said averaging means comprises:
   means for calculating average values of image data within a plurality of apertures having a plurality of sizes corresponding to a plurality of variances; and
   means for selecting one of the average values based on the variance detected by said detecting means.

5. An apparatus according to claim 1, further comprising:
   means for changing a size of image represented by output image data from said averaging means.

6. An image processing apparatus for converting input digital image data into halftone image data, the apparatus comprising:
   means for calculating an auto-correlation value of each line of image data;
   means for calculating an average value of auto-correlation values of a plurality of lines;
   means for detecting peak positions of average values of the auto-correlation values; and
   means for obtaining a cycle based on an interval of the peak positions;
   means for detecting the cycle of variation in pixel values of the input digital image data; and
   means for averaging the input digital image data within an aperture having a size corresponding to the cycle detected by said detecting means.

7. An apparatus according to claim 6, in which said auto-correlation value calculating means comprises:
   means for calculating auto-correlation values every predetermined number of pixels; and
   said means for obtaining the cycle comprises means for detecting as the cycle of the image the interval of the peak positions if at least three peak positions are detected within the predetermined number of pixels and for detecting, otherwise, as the cycle of the image an interval from a pixel position every predetermined number of pixels to a next peak position.

8. An apparatus according to claim 6, in which said averaging means comprises:
   means for selecting an aperture having a size which equals to the detected cycle.

9. An apparatus according to claim 6, in which said averaging means comprises:
   means for detecting a variation in image density of each detected cycle; and
   means for selecting an aperture having a size which equals to the detected cycle if the variation in density is less than a predetermined value and an aperture having a size shorter than the detected cycle if the variation in density exceeds the predetermined value.

10. An apparatus according to claim 6, in which said averaging means comprises:
    means for selecting only image data of pixels within the aperture having a size which equals to the detected cycle; and
    means for dividing a selected image data by a number of pixels within the aperture.

11. An apparatus according to claim 6, further comprising means for changing a size of image represented by the output image data from said averaging means.

12. An image processing apparatus for converting input digital image data into halftone image data, the apparatus comprising:
    first detecting means for detecting a variance of pixel values within a given reaction including a pixel of interest in the input digital image data;
    second detecting means for detecting a cycle of variation in pixel values of the input digital image data; and
    means for averaging the input digital image data within an aperture having a size corresponding to the variance and the cycle detected by said first and second detecting means.

13. An apparatus according to claim 12, in which said averaging means comprises means for selecting an aperture having a size corresponding to the cycle if the cycle is detected by said second detecting means and an aperture having a size corresponding to the variance it the cycle is not detected by said second detecting means.

14. An apparatus according to claim 12, in which said averaging means comprises:
    means for detecting a variation in pixel values of an image of each detected pattern; and
    means for selecting an aperture having a first size corresponding to the cycle if the cycle is detected by said second detecting means and the variation in the pixel values has a value smaller than a predetermined value and for selecting an aperture having a size shorter than the first size if the cycle is detected by said second detecting means and the variation in the pixel values exceeds the predetermined value.

15. An image processing apparatus comprising:
    means for discriminating an input image data as being a halftone image data or a digital image data and respectively outputting the halftone image data and the digital image data;
    first detecting means for detecting variance of pixel values from the digital image data;
    second detecting means for detecting a cycle of variation in pixel values of the digital image data;
    means for averaging the digital image data within an aperture having a size corresponding to the variance and the cycle detected by said first and second detecting means; and
    means for combining the image data output from said averaging means and the halftone image data.

16. An apparatus according to claim 15, in which said averaging means comprises means for selecting an aperture having a size equal to the cycle if the cycle is detected by said second detecting means and an aperture having a size corresponding to the variance if the cycle is not detected by said second detecting means.

17. An apparatus according to claim 15, in which said averaging means comprises:
    means for detecting a variation in pixel values of an image of each detected pattern; and
    means for selecting an aperture having a first size corresponding to the cycle detected by said second detecting means if the cycle is detected by said second detecting means and the variation is smaller than a predetermined value and for selecting an aperture having a size shorter than the first size if the cycle is not detected and the variation exceeds the predetermined value.

18. A method of estimating a halftone image from a digital image, comprising the steps of:

discriminating by detecting whether or not pixel values of the digital image vary with a cycle and detecting a variation in density of an image of each cycle if the cycle is detected, and detecting a degree of variance of pixels of the digital image and a type of digital image;

determining an aperture having a size corresponding to the type of digital image discriminated; and averaging by selecting an aperture having a first size equal to the detected cycle if the variation in density is smaller than a predetermined level selecting an aperture having a size shorter than the first size if the variation in density is larger than the predetermined level, and selecting an aperture having a size corresponding to the degree of variance of pixels if the cycle of the digital image is not detected.

19. An image processing apparatus for converting input digital image data into halftone image data, said apparatus comprising:

detecting means for detecting a variance of pixel values within a given region including a pixel of interest in the inputted digital image data comprised of a table means for inputting a dot pattern of a given region and for outputting a similarity between the dot pattern of the given region and a dot pattern representing a pseudo halftone image or a dot pattern representing a bilevel image;

means for selecting a first aperture which is larger than a predetermined area if the variance is larger than a predetermined level and a second aperture which is smaller than the predetermined area if the variance is smaller than the predetermined level;

means for averaging the inputted digital image data within said aperture having a size corresponding to the variance detecting by said detecting means.

* * * * *